United States Patent
Cai et al.

(10) Patent No.: US 9,994,712 B2
(45) Date of Patent: Jun. 12, 2018

(54) METHOD OF PRODUCING ULTRA-LOW DENSITY FIBER COMPOSITE MATERIALS

(71) Applicant: FPInnovations, Pointe-Claire (CA)

(72) Inventors: Xiaolin Cai, Quebec (CA); Xixian (James) Deng, Quebec (CA); Nicolas Dery, Quebec (CA); Sebastien Lebel, Quebec (CA); Gilles Brunette, Quebec (CA); Gilles Marcel Dorris, Quebec (CA); Yuxia Ben, Kirkland (CA); Michelle Ricard, Pointe-des-Cascades (CA); Yaolin Zhang Zhang, Quebec (CA); Dian-Qing Yang, Quebec (CA); George Sacciadis, Laval (CA)

(73) Assignee: FPINNOVATIONS, St-Jean, Pointe-Claire, QC (CA)

( * ) Notice: Subject to any disclaimer, the term of this patent is extended or adjusted under 35 U.S.C. 154(b) by 89 days.

(21) Appl. No.: 15/146,942

(22) PCT Filed: Nov. 5, 2014

(86) PCT No.: PCT/CA2014/051058
§ 371 (c)(1),
(2) Date: May 5, 2016

(87) PCT Pub. No.: WO2015/066806
PCT Pub. Date: May 14, 2015

(65) Prior Publication Data
US 2016/0289453 A1    Oct. 6, 2016

Related U.S. Application Data

(60) Provisional application No. 62/067,059, filed on Oct. 22, 2014, provisional application No. 61/900,035, filed on Nov. 5, 2013.

(51) Int. Cl.
| | |
|---|---|
| *C08L 97/02* | (2006.01) |
| *C08L 1/02* | (2006.01) |
| *D21H 21/56* | (2006.01) |
| *D21F 11/00* | (2006.01) |
| *C08J 9/00* | (2006.01) |
| *C08J 9/06* | (2006.01) |
| *C08L 33/26* | (2006.01) |

(52) U.S. Cl.
CPC .............. *C08L 97/02* (2013.01); *C08J 9/0061* (2013.01); *C08J 9/06* (2013.01); *C08L 1/02* (2013.01); *C08L 33/26* (2013.01); *D21F 11/002* (2013.01); *D21H 21/56* (2013.01); *C08J 2333/26* (2013.01); *C08J 2397/02* (2013.01); *C08J 2431/04* (2013.01); *C08J 2433/26* (2013.01); *C08L 2203/14* (2013.01)

(58) Field of Classification Search
CPC .. C08L 1/02; C08L 33/26; C08L 97/02; C08J 9/0061; C08J 9/06; D21F 11/002
See application file for complete search history.

(56) References Cited

U.S. PATENT DOCUMENTS

| | | |
|---|---|---|
| 4,271,291 A | 6/1981 | Dayvolt |
| 2009/0163610 A1 | 6/2009 | Lanning et al. |
| 2013/0017394 A1 | 1/2013 | Hua et al. |

FOREIGN PATENT DOCUMENTS

| | | |
|---|---|---|
| JP | 2002294580 | 10/2002 |
| JP | 2004523669 | 8/2004 |
| JP | 2010159389 | 7/2010 |
| JP | 2013526657 | 6/2013 |
| WO | 9961518 | 12/1999 |
| WO | WO20122006714 | 1/2012 |

OTHER PUBLICATIONS

Xie, Y., et al. "Manufacture and Properties of Ultra-Low Density Fibreboard from Woof Fibre", BioREsources, 2001, vol. 6, pp. 4055-4066.

Georgia Kraft Company for the U.S. Department of the Interior, "Foam Seperation of Kraft Pulping Wastes", Pctober 1969, pp. 15-16.

*Primary Examiner* — Edward J Cain
(74) *Attorney, Agent, or Firm* — Norton Rose Fulbright Canada LLP

(57) ABSTRACT

A method of producing ultra-low density fiber composite (ULDC) foam materials using natural fibers with gas injection through liquid foaming is disclosed, wherein in a particular embodiment includes also cellulose filaments. The method includes a continuous overflow foaming process and a novel apparatus to produce the ULDC materials. The disclosed ULDC composite foam produced includes moisture, mold, decay and fire resistant properties which can be used for building thermal and acoustic insulations, protection packaging, air filter products, hygiene products. The apparatus comprise a vessel, counter rotating dual impellor, a plurality of baffles and gas injection that produce.

18 Claims, 17 Drawing Sheets

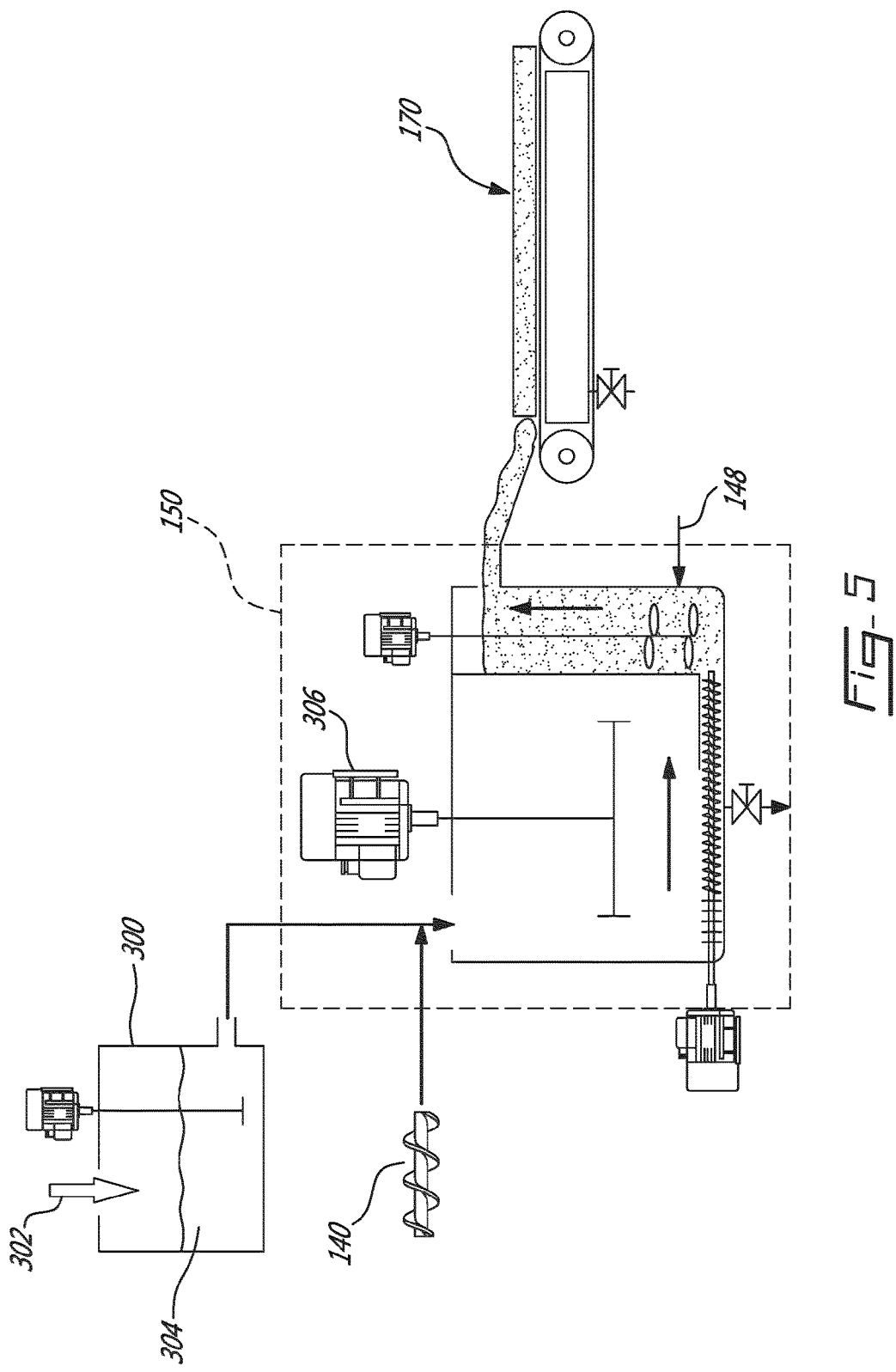

METHOD OF PRODUCING ULTRA-LOW DENSITY FIBER COMPOSITE MATERIALS

CROSS REFERENCE TO RELATED APPLICATION

This application claims priority from U.S. Provisional Application Ser. No. 61/900,035, filed Nov. 5, 2013, and U.S. Provisional Application Ser. No. 62/067,059, filed Oct. 22, 2014, the entire content of which are incorporated herein by reference.

FIELD OF THE INVENTION

This invention discloses a continuous method for producing ultra-low density fiber composite (ULDC) foam using natural fibers with gas injection through liquid foaming.

BACKGROUND OF THE INVENTION

Bio-based foams are moving into the mainstream of the construction/building industry and the protective packaging industry, this move is being driven by a need to replace petroleum based foams. Bio-based foams reduce carbon footprints, and the risk of unpredictable and increasing prices of fossil fuels based foams.

Starch-based foams, vegetables oil based polyurethane foams with addition of natural fibers with biodegradable or synthetic polymers were disclosed in the following: U.S. Pat. Nos. 5,308,879, 5,958,589, 5,266,368, WO 2006/133528 A2 and Liu et al. (2009, *J. Forestry Research,* 20(2): 161-164).

In the U.S. Pat. No. 4,386,119, discloses a wet process and apparatus for rendering cellulosic insulation particles fire-retardant through impregnation of a cellulosic insulating material, such as waste paper in finely divided form, with an aqueous solution of a non-hygroscopic fire retardant compositions, for example, boric acid is dissolved with a minimum amount of water as the impregnated spraying agents.

U.S. Pat. No. 7,482,058 B2 discloses a method of making cellulose material with improved absorbency. An absorbent cellulose material having an application of superabsorbent polymer adhered to the cellulose material, wherein an aqueous solution of pre-superabsorbent polymer is applied to the cellulose material and converted to superabsorbent polymer upon subjecting to a sufficient time. The absorbent cellulose material has a fluid retention of greater than 2 g/g.

U.S. Pat. No. 5,372,877, describes a method of producing a biodegradable cushioning product which may include cellulose fibers from waste paper, in which superabsorbent polymers such as starch graft copolymers and/or modified hydrophilic polyacrylates were added. In this method, around 10% of a water soluble adhesive is used. Porous foam materials made from aerocellulose gels were reported (2006) through drying the gels in supercritical conditions so that the openness of the gel structure is largely maintained.

A method to produce a natural fibrous foamed product is described in CN1912247A (2007) and WO 2012/006714, where the alkaline treated fiber is used as a key component to form the three dimensional foamed fibrous composites panel. The process method includes multiple steps, where the $1^{st}$ step is the preparation of alkaline fiber at high temperature and pressure, followed by a protracted washing process until a desired pH value for the alkaline fiber. This step requires many hours of work. The $2^{nd}$ step of the process is a multiple foaming step to make the foamed fibrous materials, which included fiber presoaking, fiber disintegrating, adding adhesives and surfactants, and foaming, with the addition of certain foaming agent. The foaming process requires up to 4.5 hours to produce the foam. The process includes a further 8 to 20 hours for the drainage and the drying process for the products described in the disclosure.

There remains a need for an efficient continuous foaming process for fiber composite materials, using a simplified and scalable foaming apparatus and drying process, for the production of the ULDC products in an industrially viable manner.

SUMMARY OF THE INVENTION

A method of making natural fibrous ultra-low density composites (ULDC) materials with gas injection is described. The present method includes a continuous overflow foaming process using a specialized apparatus to produce the ULDC materials. The disclosed ULDC materials have specific characteristics including: moisture levels; mold, decay and fire resistance; uses in building construction as thermal/acoustic insulation materials; green construction materials for multi-function panels; protective packaging materials; air filter materials; hygiene and other potential applications.

In one aspect of the invention there is a novel method comprising a continuous overflow process to produce natural fiber ultra-low density composites (ULDC) materials with gas injection through liquid foaming.

In accordance with one aspect of the present invention, there is provided a method for producing a natural fiber ultra-low density composite (ULDC) foam, the method comprising the steps of feeding a fiber suspension and at least one additive into a foaming apparatus; sparging gas into the foaming apparatus; agitating the suspension and the at least one additive to produce the foam; and discharging the foam through an outlet in the foaming apparatus.

In an embodiment, the fiber suspension has 0.1-30% by weight fiber consistency.

In accordance with another aspect of the method herein described, the foam has a density of less than or equal to 150 $kg/m^3$ and open cell structure.

In accordance with yet another aspect of the method herein described, the foam has a density of in the range of 10 $kg/m^3$ to 150 $kg/m^3$, most preferred to 40 $kg/m^3$-100 $kg/m^3$ with open cell structure.

In accordance with still another aspect of the method herein described, the dry fiber foam material has an open cell foam structure.

In accordance with yet still another aspect of the method herein described, the method further comprises drainage and drying of discharged foam from the vessel to produce a ULDC foam mat.

In another embodiment, the ULDC mat is dried to reduce moisture content in the mat to less than 15% by weight moisture as a percentage of the total mat.

In accordance with yet a further aspect of the method herein described, cellulose filament (CF) is fed to the foaming apparatus or machine.

In an embodiment, the CF comprises lengths of up to 300-350 µm.

In another embodiment, the CF comprises diameters of 100-500 nm.

In a further embodiment, the CF is predispersed or surface modified prior before being fed into the foaming apparatus.

In an embodiment, the CF is produced by multi-pass, high consistency refining of wood or plant fibers.

In another embodiment, the CF is from bleached softwood kraft pulp.

In a further embodiment, the CF is predisposed or surface modified by using a standard pulp disintegrator, a mixing tank, a helico pulper or a Lamort pulper.

In accordance with yet a further aspect of the method herein described, the method comprises adding at least two additives or an inorganic component into the foaming apparatus.

In accordance with another aspect of the present invention, there is provided a natural fiber ultra-low density composite (ULDC) foam producing apparatus, the apparatus comprising: a vessel comprising an internal diameter D; a base; a top opposite the base, a length L measured from the base to the top; the vessel defining a fiber suspension inlet; at least one gas inlet in the base; at least one inlet for an additive, and an overflow outlet for discharging the ultra-low density fiber (composites) foam from the top; a plurality of baffles fixed within the vessel, wherein the baffles have a width, Wb and a length Lb; a first impellor located in the base and rotating in a first direction and comprising a diameter d1, and a second impellor above the first impellor and rotating in a second direction opposite the first direction, the second impellor comprising a diameter d2, and wherein the first impellor disintegrates fiber of the fiber suspension and the second impellor homogenizes the fiber suspension with the gas and the additives.

In an embodiment, the foaming apparatus is adjacent to and fed from a premixing vessel.

In another embodiment, the fiber suspension is fed to the apparatus by a screw pump.

In accordance with yet another aspect of the present invention, there is provided a natural fiber ultra-low density composite (ULDC) foam comprising a natural fiber having a consistency of is 0.1-30%, a foaming agent, a water component, wherein the foam has a density from 10 kg/m$^3$ to 150 kg/m$^3$ and open cell structure.

In accordance with yet another aspect of the present invention, there is provided a natural fiber ultra-low density composite (ULDC) foam comprising a natural fiber having a consistency of is 0.1-30%, a foaming agent, a water component, and a cellulose filament, wherein the foam has a density from 10 kg/m$^3$ to 150 kg/m$^3$ and open cell foam structure.

In an embodiment, the foam further comprises cellulose filament (CF).

In accordance with still another embodiment, the CF is from wood pulp or plant pulp.

In accordance with still another embodiment, the CF is from bleached softwood kraft pulp.

In accordance with still another embodiment, the foam further comprises pulp fibers.

In another embodiment, CF is produced by multi-pass, high consistency refining of wood or plant fibers.

In accordance with still another embodiment, the CF/pulp fibers ratio is from 100/0 to 0/100, preferably from 25/75 to 5/95, more preferably from 10/90 to 1/99.

In accordance with still another embodiment, the foam is a rigid panel or a flexible mat.

In accordance with still another embodiment, the foam further comprises at least one additive or an inorganic component.

In an embodiment, the additive is an adhesive, an adhesive hardener, a sizing agent, a mold resistant compound, a fiber decay resistant compound, a fire resistant compound, a smoke resistant compound, or a combination thereof.

In another embodiment, the adhesive is adhesive polyvinyl alcohol (PVA), poly(vinyl acetate) (PVAc), or a combination thereof.

In a further embodiment, the sizing agent is alkyketene dimer (AKD).

In an embodiment, the inorganic component is zinc borate, cupric carbonate ($CuCO_3$), disodium octaborate, cupric sulfate ($CuSO_4$), boric acid, perlite, silicon dioxide ($SiO_2$), potassium sulfate ($K_2SO_4$), or a combination thereof.

In another embodiment, the foaming agent is sodium dodecyl sulphate (SDS).

In accordance with still another embodiment, the foaming agent is injected with the gas in the foaming apparatus.

In an embodiment, the inorganic components are perlite.

In accordance with still another embodiment, CF is fed to the foaming apparatus and perlite is added into the foaming apparatus.

In accordance with another embodiment, 1-10% CF is fed to the foaming apparatus and at least one of perlite 10, perlite 30, perlite 70, and perlite 150 is added into the foaming apparatus.

In accordance with another embodiment, the at least one additive is mixed with the fiber suspension prior to being fed into the foaming apparatus.

In accordance with another embodiment, the at least one additive is mixed with the fiber suspension in a premix tank before being fed into the foaming apparatus.

In an embodiment, the premix tank is a British disintegrator, an helico pulper or a pilot plant pulping tank.

In accordance with still another embodiment, the fiber suspension is pre-soaked in water to disintegrate the fiber before being fed into the foaming apparatus.

In an embodiment, the water is at a temperature of 55° C.

In another embodiment, the fiber suspension is further fed into a twin roll press to increase the consistency before being fed into the foaming apparatus.

In an embodiment, the fiber suspension is fed into a progressive cavity pump increasing the pressure and forcing the suspension to go into the foaming apparatus.

In accordance with still another embodiment, the the foaming apparatus is a high shear mixer.

In another embodiment, the fiber suspension consists of wood pulp is made with wood pulp.

In a further embodiment, the fiber suspension is replaced with wood chip.

In accordance with still another embodiment, the wood pulp or wood chip are mixed with the at least one additive and refined into a first refiner producing a foamable pulp, said foamable pulp being fed into the foaming apparatus.

In an embodiment, the foamable pulp is further dried in a dryer before being fed into the foaming apparatus.

In another embodiment, the dryer is a flash dryer.

In a further embodiment, the at least one additive is feed into a blowline or the dryer.

In another embodiment, water is added to the foamable pulp before being fed into the foaming apparatus.

In an embodiment, the foaming apparatus is a second refiner.

In accordance with another embodiment, the foamable pulp is transported to a remote location before being fed into the foaming apparatus at said remote location.

In a further embodiment, a pressurized reactor is further used in combination with the first refiner to defibrate the wood pulp or wood chip into loose structures of fiber.

In another embodiment, the foam is further fed onto a drainage table or a belt filter to drain the foam.

In another embodiment, the foam is further dried in a dryer to reduce the moisture of said foam.

In accordance with another embodiment, the foam is further discharge into a forming box.

In another embodiment, the fiber suspension is further chemically treated to attack the secondary fiber walls and improve the bonding characteristics before being feed into the foaming apparatus.

In an embodiment, the gas is compress air, nitrogen, argon, and carbon dioxide.

In accordance with another embodiment, the foam comprises 0.5-10% CF and at least one of perlite 10, perlite 30, perlite 70, and perlite 150, where the number after perlite is the ratio of fibre/perlite. The size of perlite is in the range of 0-5 mm, preferably the fine size of 0-2 mm.

In an embodiment, the foam comprises CF/pulp ratio of 1/99 to 10/90 and at least one of perlite 10, perlite 30, perlite 70, and perlite 150.

In accordance with still another embodiment of the apparatus herein described, the apparatus further comprises at least one of chemicals additives or inorganic components selected from the group of adhesives, adhesive hardeners, mold resistant compounds, fiber decay resistant compounds, fire resistant compounds, smoke resistant compounds and combinations thereof.

In accordance with yet still another embodiment, the foam is mold and decay resistant.

In accordance with yet still another embodiment, the foam further comprises pulp fibers.

In accordance with a further embodiment, the foam has a thermal resistance of around R-4/inch based on a ASTM C-518-10 test.

BRIEF DESCRIPTION OF THE DRAWINGS

Further aspects and advantages will become better understood with reference to the description in association with the following drawings in which:

FIG. 5 illustrates a schematic representation of a ULDC production process according to one embodiment;

DETAILED DESCRIPTION OF THE INVENTION

The method and process described herein produce natural fibrous ultra-low density fiber composite (ULDC) materials. A foaming apparatus is used. The apparatus includes counter rotating agitators and gas injection producing a foam at an overflow at the top of the apparatus. The functional formulations, gas injection foaming, continuous overflow foaming process, vacuum draining process, drying process, and the resulting end products described herein are different than those of the prior art (WO 2012/006714, CN1912247A).

The method and process described herein produce ULDC foam quickly in approximately less than 10 min, preferably 2-5 min. This is in stark contrast to the prior art where hours are required to produce a fiber foam.

Figure 1A:
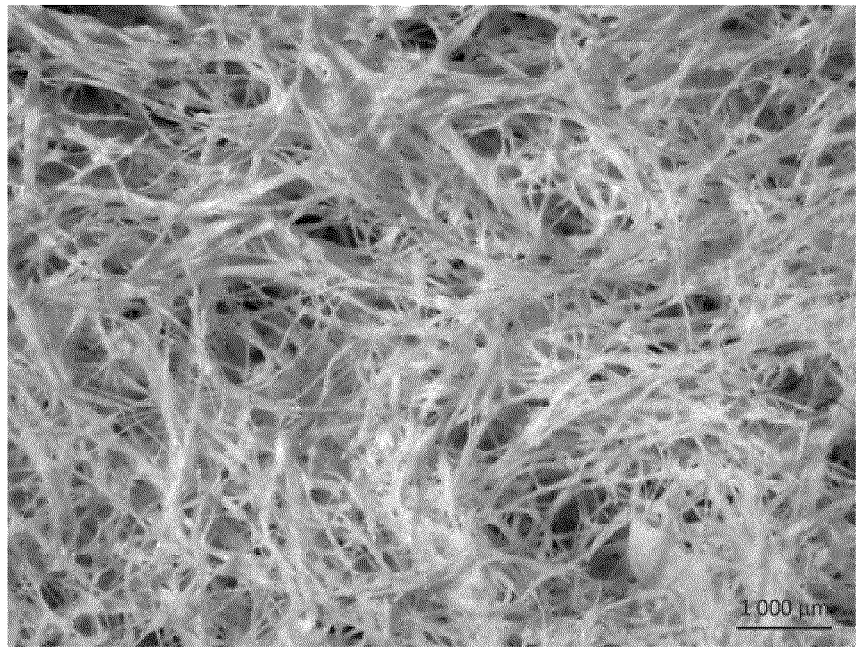
FIG. 1(a) is a microscope photograph of natural fiber foaming materials of the PRIOR ART with the batch process of Deng et al., WO 2012/006714 A1.

Chinese patent CN1912247A and WO 2012/006714 use mechanical agitation to introduce the air from atmosphere into the foam from the surface of the liquid through the vortex. These prior art methods produce a foam where the air volume and foam bubble size are difficult to control and produce an non-uniform (bubble size distribution) foam as is illustrated in FIG. 1(a), where the bubble size distribution ranged from 200 µm-2500 µm.

Figure 1B:
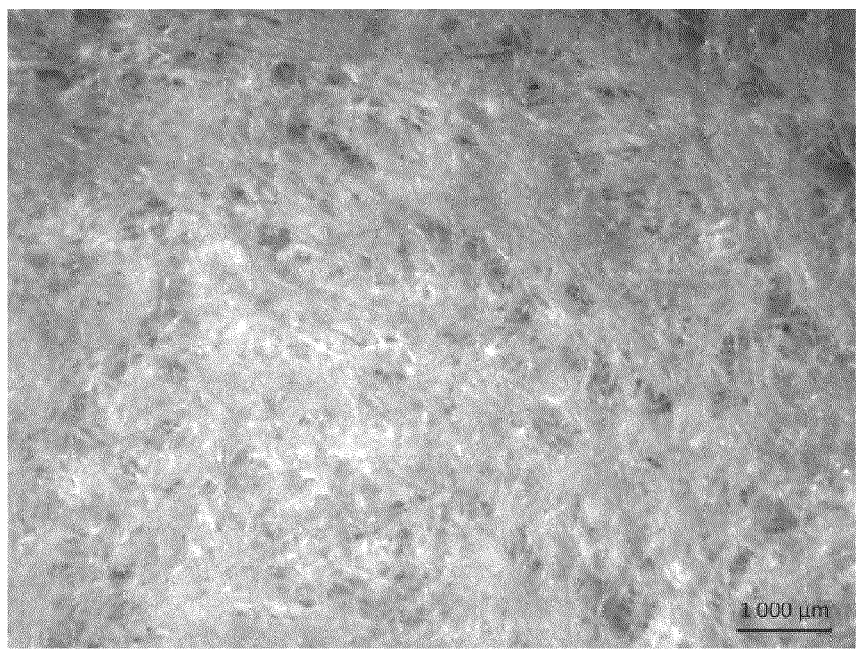
FIG. 1(b) is a microscope photograph of the ultra-low density fiber composite in accordance with one embodiment of the present invention.

This is in contrast to the present method where the fibrous mixture is continuously introduced into the apparatus with gas at the base of the vessel to form a uniform fibrous foam wherein air from atmosphere is substantially blocked from entering the system by the specially designed foaming apparatus including vessel wall mounted baffles. As will be further described, with the present method, air volume and bubble size are controllable, and foam bubble size is more homogeneous in FIG. 1(b) as compared to the prior art.

Figure 2A:
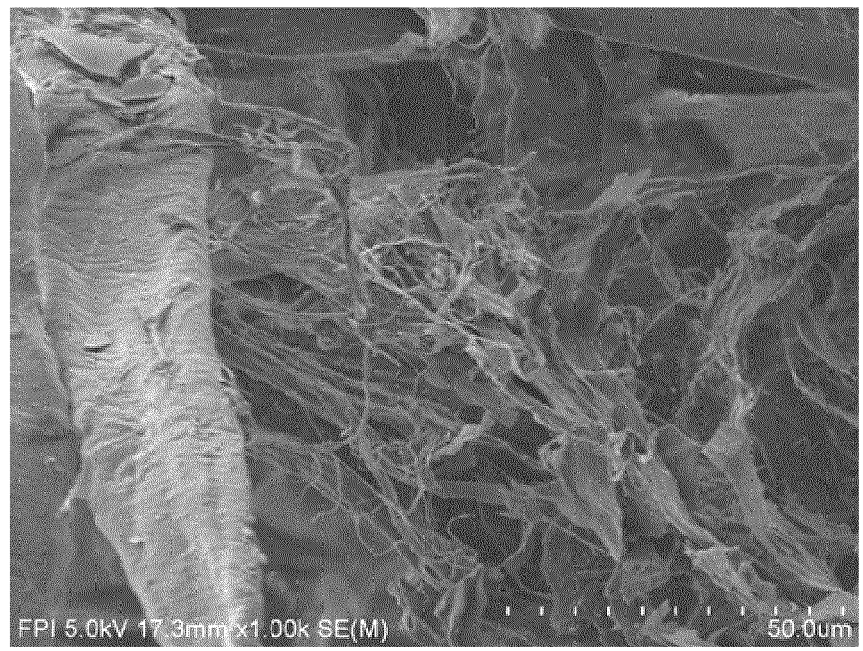
FIG. 2(a) is a scanning electronic microscope (SEM) photograph of a ultra-low density foam comprising 10% CF in accordance with one embodiment of the present invention.
Figure 2B:
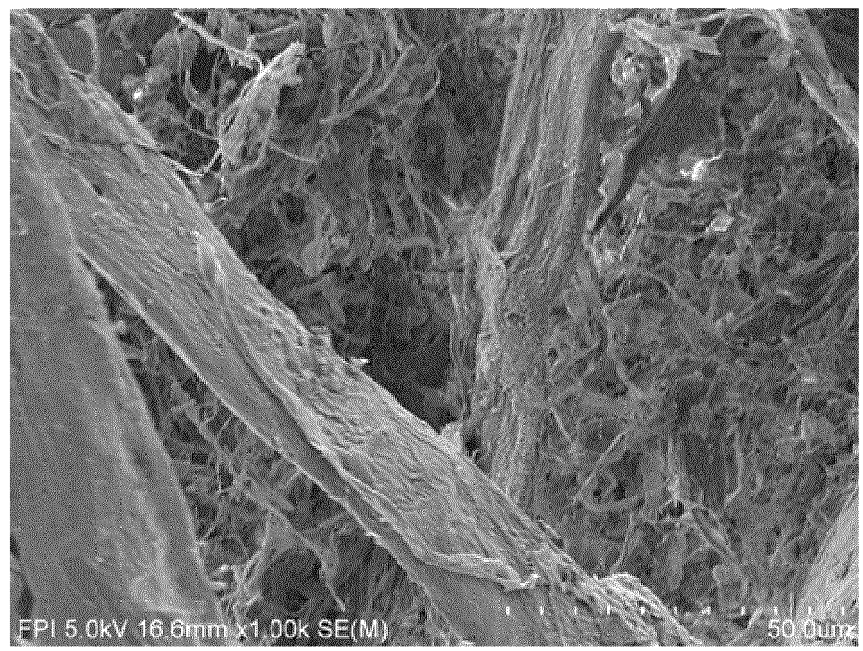
FIG. 2(b) is a SEM photograph of a ultra-low density foam comprising 50% CF in accordance with one embodiment of the present invention.

The ULDC materials described herein can also comprise in a preferred embodiment cellulose filament (CF) (see FIGS. 2(a) and 2(b)). The cellulose nanofilaments, defined herein referred to as cellulose filaments (CF), have in a preferred embodiment lengths of up to 300-350 µm and diameters of approximately 100-500 nm. The CFs are produced by multi-pass, high consistency refining of wood or plant fibers such as a bleached softwood kraft pulp as described in W02012/097446 A1 incorporated herein by reference.

The CF used herein can be the long and high aspect ratio of cellulose filament produced from the method described in U.S. 2011/0277947 and U.S. 2013/0017394, or from wood pulp or other fiber pulp, with or without plant fibers, such as regular pulp fibers, MDF fiber, agriculture fibers and recycle fibre such as news print. The CF encompassed herein can comprise CF materials with long length up to several millimetres, and high aspect ratio up to 5000.

The CF used herein is in never-dried form or CF dry film. As described herein, the CF can be pre-dispersed or surface modified prior to its addition into the foaming tank.

The never-dried CF or CF dry film can be dispersed in laboratory using a standard pulp disintegrator based on PAPTAC Standard C.4 and C.5. For example, a predetermined amount of CF sample (CF consistency between 20-35%) was weighted and added in a standard pulp disintegrator. Consistency is defined herein in reference to a ULDC comprising CF as the water percentage of a cellulose material in a mixture of the cellulose material and water. The CF was diluted to a desired consistency with hot distilled water (~90° C.) to get a final temperature of 80° C. after dilution. It was disintegrated and then the dispersed CF can be diluted in the container to the desired consistency.

The never-dried CF or CF dry film can also be dispersed in commercial pilot plant of a mixing tank to a desired consistency with hot water (temperature can be up to 70° C.) for a certain period of time prior to mixing with the foaming fiber.

Other disintegration equipment such as helico pulper, Lamort pulper can be used for the dispersion of CF. However, the disintegration parameters might be slightly different due to the capacity of the equipment, the water temperature, the rpms, the fiber consistency, the fiber disintegration time and the procedure needed for the standard disintegration method.

The CF might be used alone or with a mixture of a certain amount of pulp fiber. Cellulose nanofilaments have high water retention due to the large surface area (see U.S. 2013/017394).

The ratio of CF fiber versus regular pulp fiber used can range from 100/0 to 0/100, preferably in the range of 25-1/75-95, most preferably in the range of 10-1/90-99.

The present discloses a novel foaming method for fibrous materials with a continuous overflow that produces natural fiber ultra-low density composites (ULDC) materials that are uniformitized through vigorous agitation and gas injection through a foaming liquid. The disclosed process illustrated in block flow diagram of FIG. 3 and a novel foaming apparatus of FIGS. 4(a) and 4(b) will be described in greater detail. The diagrams described herein are for illustration purposes only and are not intended to limit the scope of the claims, that should not be limited by the preferred embodiments set for the in the examples, but should be given the broadest interpretation consistent with the description as a whole.

Figure 3:
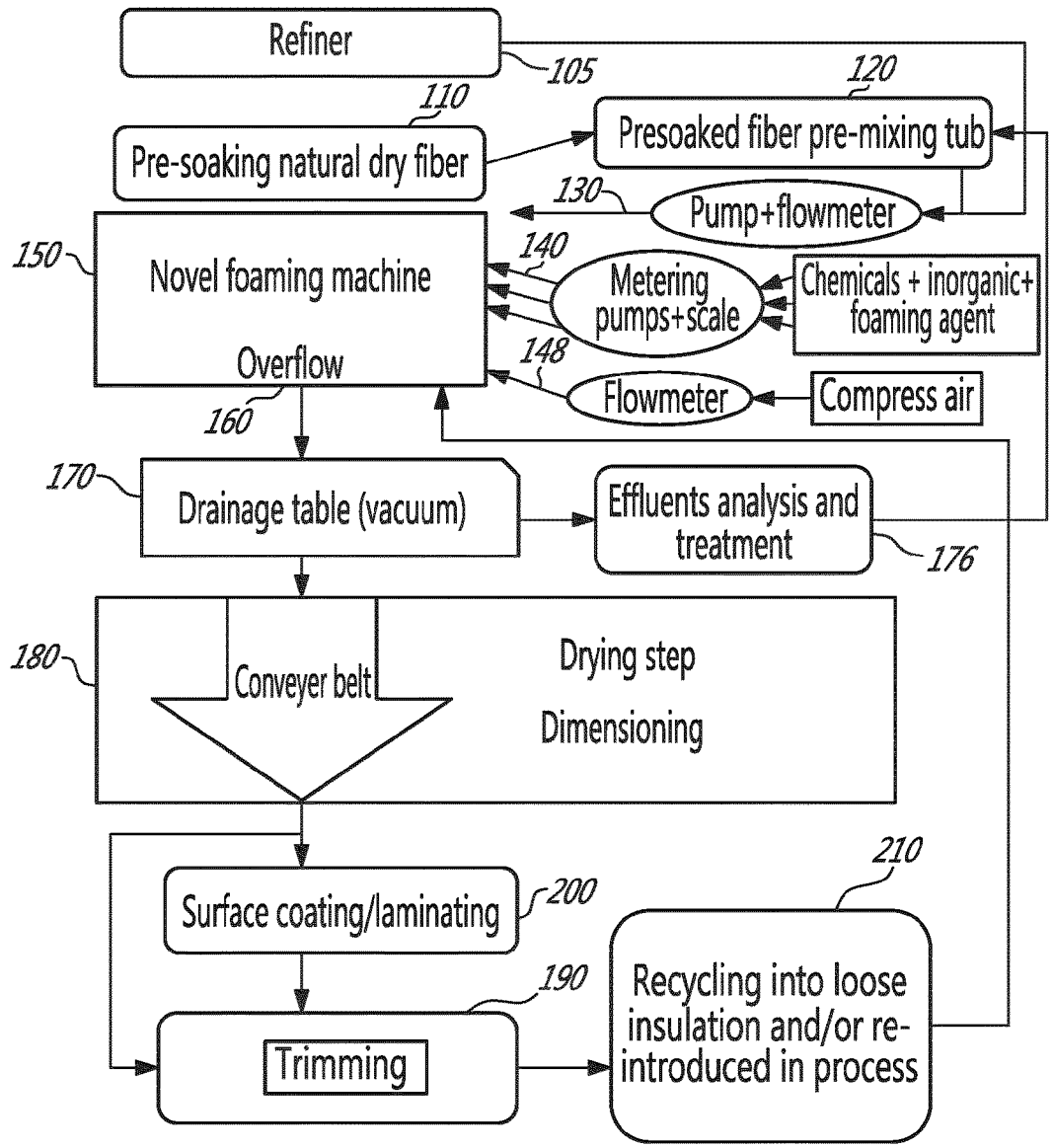
FIG. 3 illustrates a flow diagram of a ULDC production process according to one embodiment of the present invention.

FIG. 3 illustrates a flow diagram of a ULDC production process 100 according to one embodiment of the present invention and comprises at least four (4) steps.

In a first step, a wet natural fiber slurry, such as a thermomechanical pulp (TMP), chemi-thermomechanical pulp (CTMP/Kraft) from a refiner 105 having a 0.1-30% by weight fiber consistency is metered and pumped directly into a foaming apparatus 150. Dry natural fibers are soaked in water prior to being fed in a pre-soaking step for dry fiber 110 and via a pre-soaked pre-mixing tub 120.

In a second step of the continuous overflow foaming process/method 100 the wet fiber slurry from a fiber pump and flowmeter is fed to the continuous foaming machine/apparatus 150 via stream 130 from a pump/flowmeter or metering pump. The pre-dispersed cellulose filament when used is also pumped into the foaming apparatus 150. Various additives, such as chemicals, inorganic components 140, are also dosed into the foaming apparatus 150 via pumps and/or scales. Such chemical additives are for example, and not limited to, a sizing agent, surfactant, binding agent, structure stabilization, moisture resistant, mold and decay resistant, biocide, fire and smoke retardant and other functional properties improvement.

A gas 148, in a preferred embodiment, is metered/sparged into the apparatus 150. The gas may be from a compressor (oil-free) or from a storage cylinder. Other gases may also be used and these include but are not limited to nitrogen, argon, and carbon dioxide. The fibers are pumped to the foaming apparatus 150 continuously with a gas controlled flow 148 that matches the desired production rate and loading 130.

Optionally, the additives 140 may also include: decay/mold resistance agents, fire/smoke retardants and foaming agents. The chemical additive dosed in the foaming apparatus 150 may include: an adhesive, such as, polyvinyl alcohol (PVA), poly(vinyl acetate) (PVAc), that are used alone or in combination; an adhesive hardener, a sizing agent (such as alkyketene dimer (AKD); a mold/decay resistant and fire/smoke retardant chemical; each or these chemical additive may be used alone or in combination with another. The inorganic component may include—zinc borate, cupric carbonate ($CuCO_3$), disodium octaborate, cupric sulfate ($CuSO_4$), boric acid once again used alone or in combination. In a preferred embodiment, at least 1 inorganic component, for example, silicon dioxide ($SiO_2$) and/or potassium sulfate ($K_2SO_4$) and a foaming agent such as sodium dodecyl sulphate (SDS) are pumped into the foaming apparatus 150. All these chemicals, inorganic and foaming agent are controlled through the metering pumps, flow-meters and scales to match the production rate and loading of the process 100.

The percentage of dry fibers to additives varies from 95/5 to 30/70 on a dry basis of fiber to additives. The composite foam produced has a low smoke index that compares well with current market petro-based insulations products. When CF is used, the CF and pulp mixture fiber consistence ranges from 0.1%-30% from the mixing tank to the foaming tank. The final product obtained when using CF in the mixture can be a rigid panel or a flexible mat depending on the formulation and thickness of the foam.

The apparatus or foaming tank 150 described herein generally has 1 to 2 minutes of residence time after the streams 130 and 140 are added and the gas 148 is introduced. All the components of the fluid mix in the apparatus 150 are agitated at a controlled rate in order to achieve the desired gas loading. The residence time in the apparatus may vary, and may be as high as 10 to 30 minutes but this is less advantageous due to larger vessel sizes that are required.

The twin-rotors of the apparatus 150 are set to rotate at a controlled speed in order to achieve the required bubble size. The mechanical details of the apparatus 150 will be shortly described.

As described the contents of the apparatus 150 are vigorously agitated and produce a fibrous foam that in a preferred embodiment discharge from the top portion or overflow 160 of the apparatus 150. The discharged foam is produced in from 1 to 10 minutes, and more preferably in 1 to 5 minutes by means of this overflow process. This ULDC process effectively converts the fibrous production from batch process to a continuous overflow. Therefore, an overflow process is herein defined as a continuous process having a continuous input of raw materials in a vessel/reactor and a continuous output of a product during operation, and where in a preferred embodiment the product is removed from a top portion of an apparatus. As described herein, the product is a fiber composite having uniform bubble size distribution.

As such, the present foaming method/process 100 and apparatus 150 better control the gas loading and cell sizes via the adjustment of all the parameters.

The overflowing foam 160 is then fed onto a drainage table 170. The drainage table 170 may be replaced by other solid liquid separation devices such a belt filters. The drainage process is selected to ensure that the structure of the foam mat is not damaged. In a preferred embodiment the liquid effluents are generally recycled to conserve water in the process 100 to the presoaked fiber pre-mixing tub 120. In a preferred embodiment, the effluents are fed to an analysis and treatment step 176, before the effluents are returned to the upstream side presoaking fiber mixing tub 120.

The drained and now drier foam mat from the drainage table 170 is transferred onto a moving conveyer belt forming an ULDC mat. The continuous mat is fed through a multi zone air/steam dryer in a drying step 180 to produce a dried ULDC foam. At this stage, the conditions of the dryer need to be set in order to dry the product quickly and without affecting its structure. The air/steam temperature and pressure, steam injection and re-circulation are adjusted for this purpose and reduce the moisture content of the mat. These drainage/drying steps 170/180 substantially reduce drying times known in the prior art.

The dried ULDC foam mat may be further processed in steps that include: surface coating/lamination 200, trimming 190, packaging and storage (not illustrated). The scraps from trimming 190 may be further recycled and returned to the foaming machine or shredded into loose insulation in a recycling/re-use unit 210. The dried ULDC mat can be assembled into desired functional products for application of packaging, air filter, wall panels and heat/acoustic insulation materials for buildings and industrial heat conservation materials.

Figure 4A:
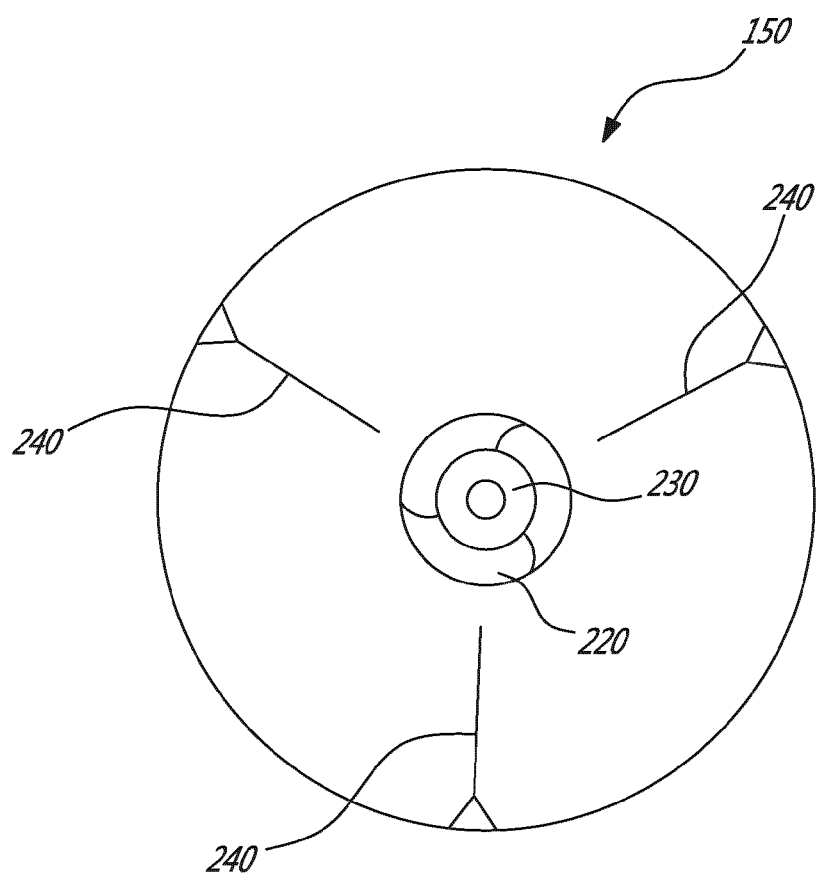
FIG. 4(a) illustrates a top view of a foaming apparatus according to one embodiment of the present invention.
Figure 4B:
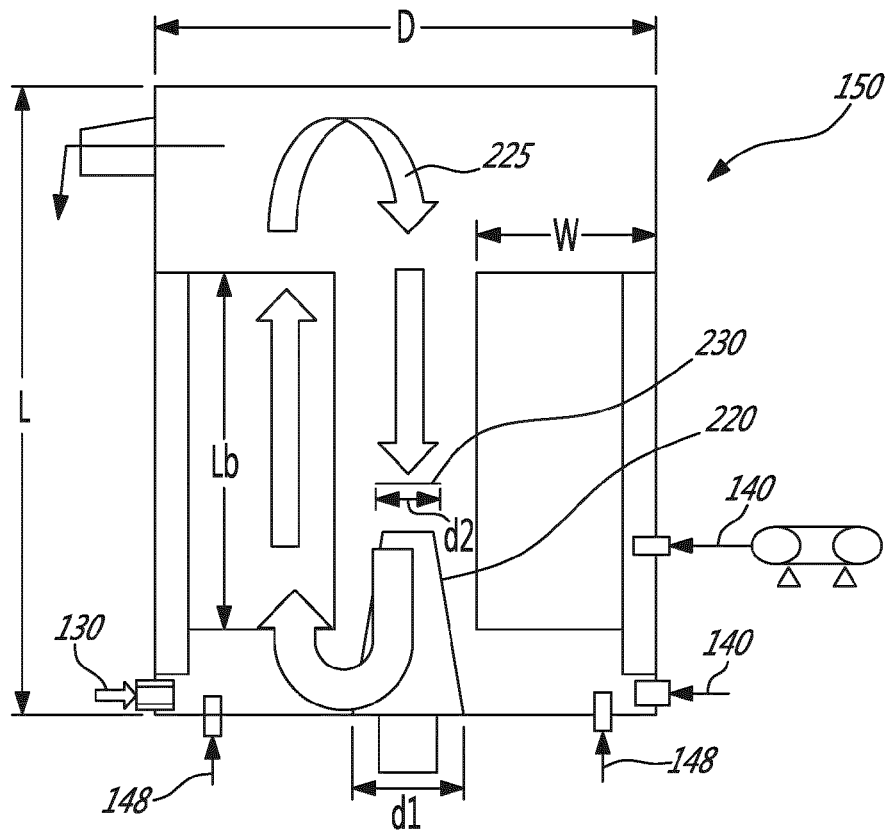
FIG. 4(b) illustrates a side view of the foaming apparatus in cross-section according to FIG. 3(a) illustrating side baffles; counter-rotating agitators, fiber, chemical, and air inlets, and foam discharge and a flow-pattern of the mixture within the apparatus.

The described method/process uses a novel machine as the foaming apparatus 150. FIGS. 4(a) and 4(b) illustrate the foaming apparatus. The pulp mixture is continuously fed/transported into the apparatus simultaneously with gas and chemicals. These chemicals serve to stabilize the foam structure, moisture resistance, mold and decay resistance, fire/smoke retardancy and improve other physical and mechanical properties.

As can be seen in FIG. 4(b) the apparatus 150 includes counter-rotating dual-rotor that spin at base/bottom of the apparatus. A first impellor 220 is located in the base of the apparatus and rotates in a first direction and a second impellor 230 above the first impellor 220 that rotates in a second direction opposite the first direction. In a preferred embodiment the two impellor 220 and 230 are parallel to the vertical axis of the apparatus 150. The first (bottom) impellor 220 disintegrates fiber of the fiber suspension and the second (upper) impellor, comprising a diameter d2, homogenizes the fiber suspension with the gas and additives.

A plurality of wide baffles 240 within the vessel or apparatus 150 set-up a flow pattern 225 (illustrated by the arrows) within the apparatus. The baffles are within the vessel generally welded to the wall of the apparatus and have a width Wb and a length Lb. In the embodiment illustrated in FIG. 4(a) three baffles 240 are illustrated. The flow-pattern 225 direction of the fiber mixture suspension converts the radial motion of the mixture to a turbulent vertical motion due to the vigorous action of the two impellors.

The apparatus 150 includes a plurality of inlets for feeding streams, where in a preferred embodiment the fiber suspension 130 and the gas 148 are fed into the base of the apparatus 150. The foam bubble size distribution can be adjusted by the controlling at least one of the speed of rotation of the impellors and the gas flow rate.

Other components may be fed to the apparatus at various points, but in preferred embodiment they are also dosed into the apparatus as the base or at a location approximately in the center of the length of the baffle (Lb). The other components apart from fibers may include at least one of the following: an adhesive, a hardener, surfactants, mold/decay/fire/smoke resistant chemicals and foaming agent. In a preferred embodiment the gas is sparged from very bottom of the apparatus (FIG. 4b) and the gas volume is controlled through the flow meter. The air bubble size of the foaming ULDC is controlled through the adjustment of the rotation speed of the twin rotor.

The design prevents the formation of a vortex at the central axis of the apparatus, and therefore blocks unwanted air from the atmosphere being introduced into the system. The two counter-rotating impellors 220 and 223 rotate at variable, speeds up to 3000 rpm, preferably from 1500 rpm to 2250 rpm.

A foam produced in the apparatus overflows 160 from the top of the apparatus 150 and is fed into a forward moving form (conveyer form). The foam forms a mat on the conveyor belt. As previously described, the effluents are collected and recycled to the head of the process. The residence time of the fibrous mixture is from 1 to 20 minutes, preferably 1-10 min, most preferably 2-5 min. Thus a continuous foaming process is formed to produce the ULDC.

In accordance with another embodiment, the method for producing a natural fiber ultra-low density composite (ULDC) foam described herein further comprises a premix tank 300 such as a pulping tank, a pulp disintegrator or other pulping equipment can be used in a premixing step (FIG. 5). The premix tank can be for example a British disintegrator, an helico pulper, a pilot plant or a paper mill pulping tank. The required amount of commercial pulp 302 are pre-soaked in required amount of hot water 304 (55° C.) for a certain period of time. At the same time, other materials chemicals 140 are introduced into the pre-mixing apparatus 306. The foaming agent and gas 148 is injected in the premix fiber with the foaming apparatus 150 and the foam ULDC is then produced.

As can be seen from FIG. 5, the foaming apparatus 150 is a multi-compartment vessel, with a pre-mixing agitator mounted in a first premixing tank. The pre-mixing tank includes a screw pump mounted in the base of the pre-mixing tank that transfers settled CF and pulp fibers to an adjacent foaming vessel (described in FIG. 4) including a mounted twin rotor agitator comprising compressed air injection. The foam produced in the foaming vessel exits from the top of the foaming vessel and falls onto a drainage table 170 where the solids are separated from the liquids. The liquids from the drying table can be recycled back to the front of the process to conserve liquid.

Accordingly, the required amount of CTMP and Kraft pulp 302 are pre-soaked in required amount of hot water 304 (55° C.) for 5 minutes. At the same time, other materials 140, which include PAM, polyvinyl acetate, hardener of polyvinyl acetate, Alkyl ketene dimmer, silicon dioxide, potassium sulfate, mold and decay resistant agent are introduced into the pre-mixing apparatus.

Pre-soaked fibers are introduced into the foaming apparatus 150. At the beginning of the fiber loading, the rotational speed of the foaming apparatus 150 is set at to a range of 200 RPM-3000 RPM, preferably in the range of 500 RPM, and further to 1500 RPM. The pre-soaked fibers along with the chemicals are then mixed together at a rotational speed of 1500 RPM for 5 min following foaming agent addition and compressed air injection 148, the pressure and volume of the compress gas can be adjusted to reach the desired level, combined with an increment of the rotational speed that reaches 3000 RPM in 20 sec. The material is mixed until desire air content occurred in the pre-mixing apparatus 306.

Figure 6:
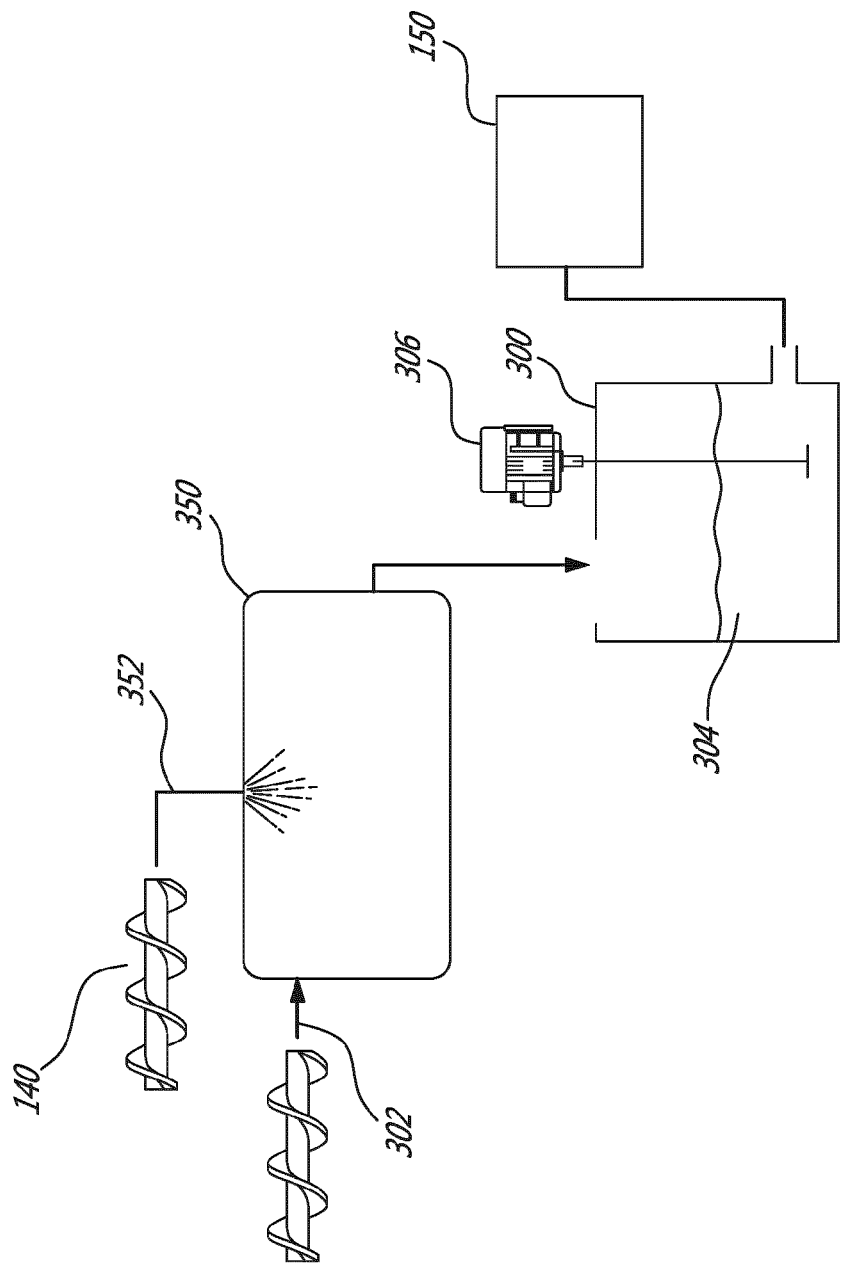
FIG. 6 illustrates a schematic representation of a ULDC production process according to one embodiment.

Typically, the defibration and fibrillation of wood fibers (or pulps) are achieved by using a refiner. In accordance with another embodiment, the method described herein comprises producing prefabricated foamable pulp fibers, comprising a first step of refining the wood fibers (or pulps) 302 in a pressurized reactor 350 and a refiner with low specific energy to defibrate the wood chips into loose structures of fibers (FIG. 6). In a particular embodiment, these fiber bundles with a large surface area can be chemically treated (in the case of CTMP for example) to attack the secondary fiber walls and improve the bonding characteristics. The refined fibers then will go into a dryer (also known as a flash dryer) through a blowline for example by the pressure differential generated with steam (or other medium) in order to produce dried fibers. The required chemicals 140 are injected into the pressurized reactor 350, into a refiner plate when used or by blending them into the premix tank 300, or alternatively, can be fed into the blowline. The same chemicals 140 used in the previously described process may be used including sizing agents, adhesives, fire retardants, fungal/decay retardants and foaming agents. These chemicals can be injected at the same time by pre-blending together or sequential injection at different injection locations along the blowline for example. This will avoid the interaction of the chemicals with each other. The dried fibers are collected from the outlet of the dryer.

A further advantage is the quick change of the mix ratio among the chemicals and overall chemical loading. The target moisture content of the fiber is controlled by inlet temperature and the dry fiber flow. Typical moisture content of the fiber after drying is about 8% (oven dry base). The typical benefit of prefabricate foamable pulp fiber as described in this embodiment is to reduce energy consumption, as less than 500 kWh/odt total specific refining energy can be achieved. In addition, further benefits include export opportunity and elimination of shipping constrains since normally the insulation materials are produced and distributed locally due to the light density to minimize the transportation cost. The prefabricated foamable fiber as described herein can be transported as compact regular pulp to a remote manufacturing site to undergo the second part of the process which is the actual foaming process. Accordingly, the dried fibers are being fed into a second refiner wherein agitation of the foamable fiber and injected gas occurs to produce the foam, or into a foaming apparatus as described herein after addition of water 304 in a premix tank 300 for example (FIG. 6).

Figure 7A:
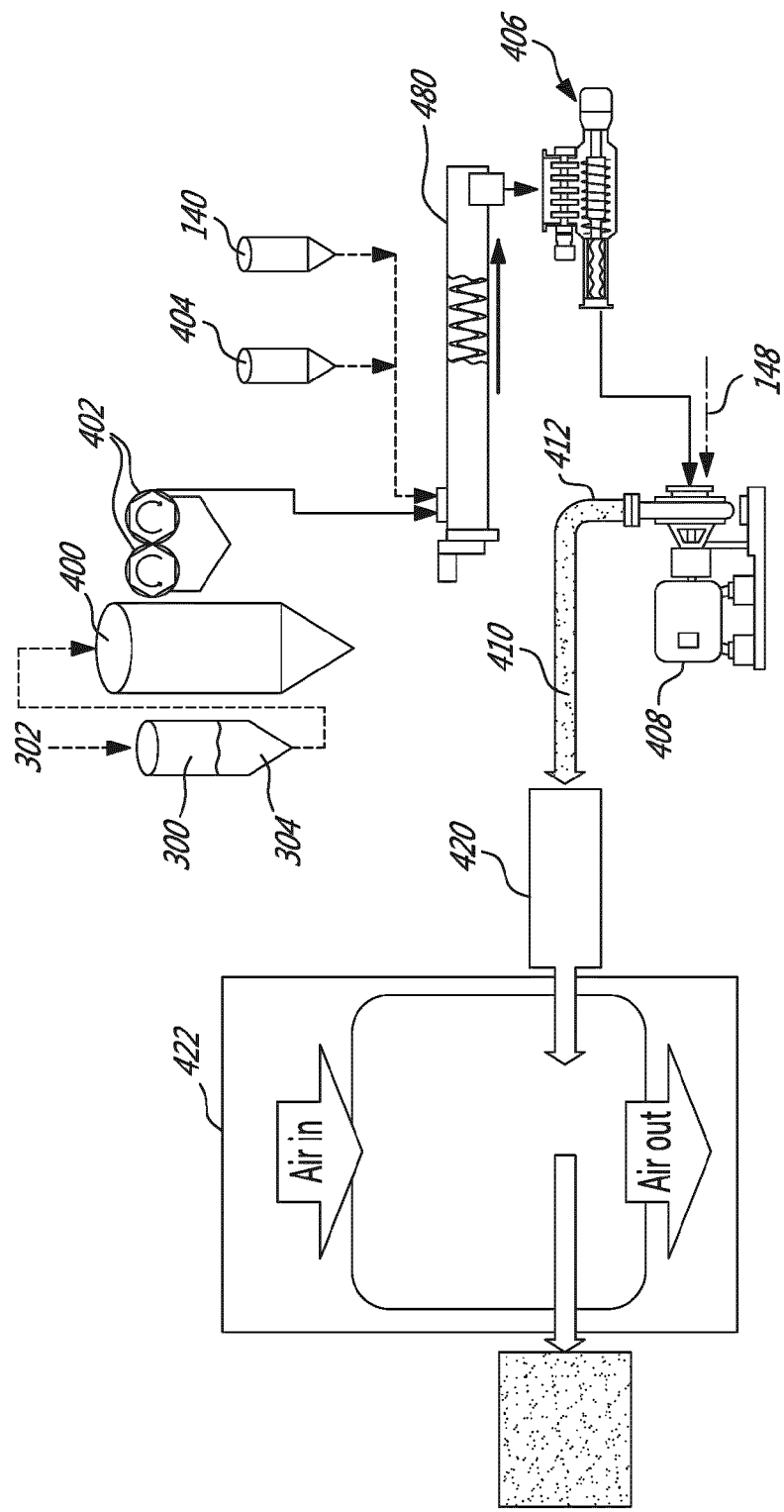
FIG. 7a illustrates a schematic representation of a ULDC production process according to one embodiment.
Figure 7B:
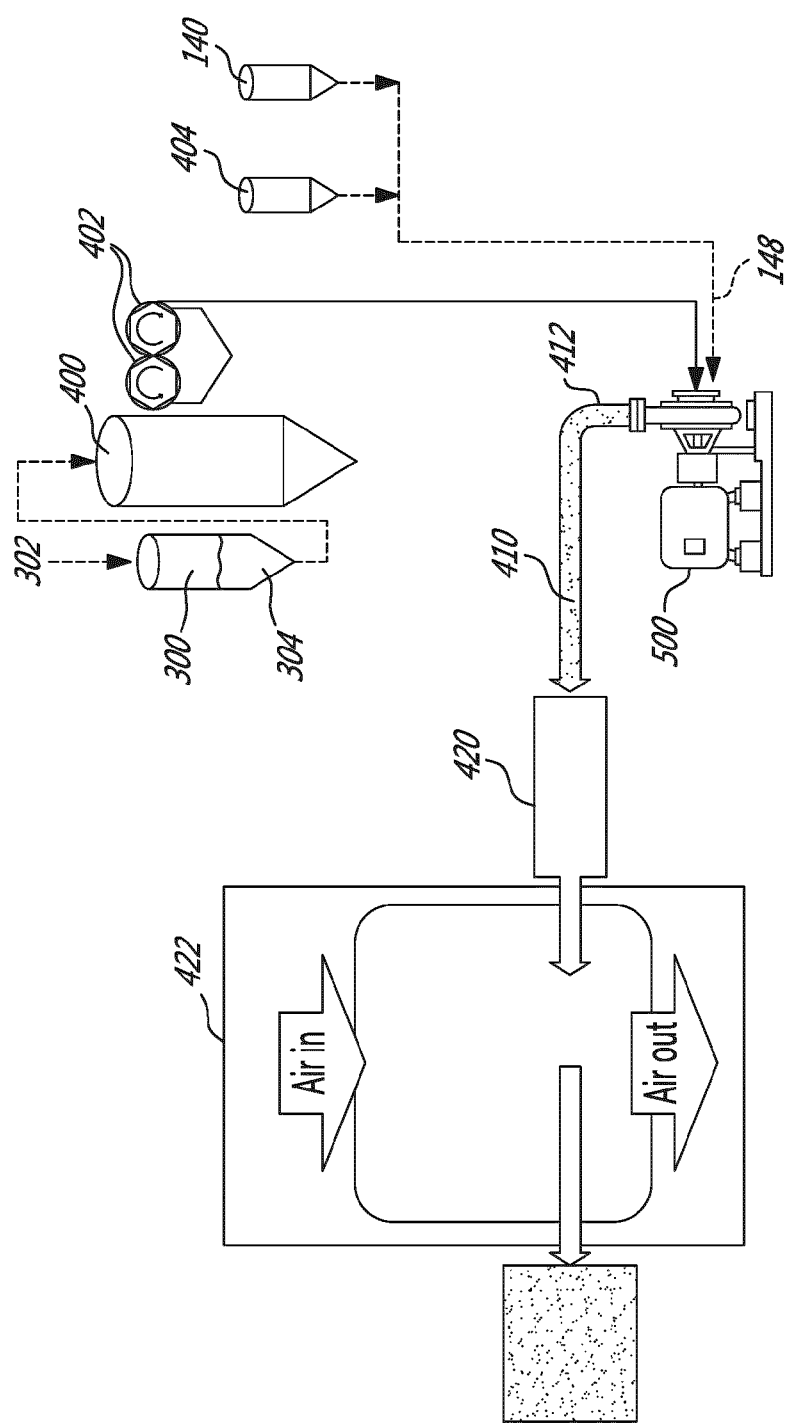
FIG. 7b illustrates a schematic representation of a ULDC production process according to an alternate embodiment using a pulp refiner.

In accordance with yet another embodiment, the method described herein comprises a first step of adding dry wood pulp 302 into dilution water 304 in a preparation tank 300 (1000 liters tank) (+/−3% consistency) (FIG. 7(*a*)). The wood pulp is disintegrated and the disintegrated wood pulp is then pumped into a feed tank 400 where it is being agitated (10 000 liters tank). The wood pulp is then pumped into a twin roll press 402 where the consistency will be brought to a range of 10-30%. The twin roll press 402 then discharges into a mixing conveyor 480 prior to being fed into one of the foaming apparatuses 150 described previously.

In accordance with yet another particular aspect of the method described herein, chemicals 140 (polyacrylamide (PAM), polyvinyl alcohol (PVA), Hardener, alkyl ketene dimmer (AKD), Potassium sulfate, and/or sodium dodecyl sulfate (SDS)) are introduced into the mixing conveyor 180 using metering pumps and flowmeters in order to reach the required loading (FIG. 7(*a*)). Dilution water 404 is added in the mixing conveyor 180 using a metering pump and flowmeter in order to lower the consistency to the final requirement. The mixing conveyor 180 discharges the mix into a progressive cavity pump 406 hopper. The progressive cavity pump 406 increases the pressure and forces the material to go through a high shear mixer 408.

In accordance with yet another particular aspect of the method described herein, a metered amount of pressurized gas 148 is introduced in the high shear mixer 408 casing to reach the required air ratio range from 0.5-5 times depending on the density as normally determined by a person skilled in the art, such as for example 3 times of air can be injected to reach a density of 30 kg/m$^3$ for the final dry ULDC products. The pulp foam 410 exits the high shear mixer 408 through a pipe 412. The pressure drop is controlled using a pinch valve. This device allows the control over the expansion of the gas bubbles. The pulp foam 410 is then sent to the forming box 420 where the shape of the final product will be set. The final product is sent to a multi-zone air dryer 422 until the moisture content is low enough to allow packaging.

FIG. 7(*b*) illustrates a schematic representation of ULDC production process according to an alternate embodiment wherein a pulp refiner 500 is used. This alternative enables to make ULDC with a refiner 500 directly with high fibre consistency. The dilution water 404 and chemicals 140 are directly fed into the pulp refiner 500. Pressurized gas 148 is introduced in the pulp refiner 500 and subsequently the pulp foam 410 exits the pulp refiner 500 through the pipe 412. Similarly to the previous process described herein above, the pulp foam 410 is sent to the forming box 420 where the shape of the final product will be set and the final product is sent to the multi-zone air dryer 422 until the moisture content is low enough to allow packaging.

Figure 9:
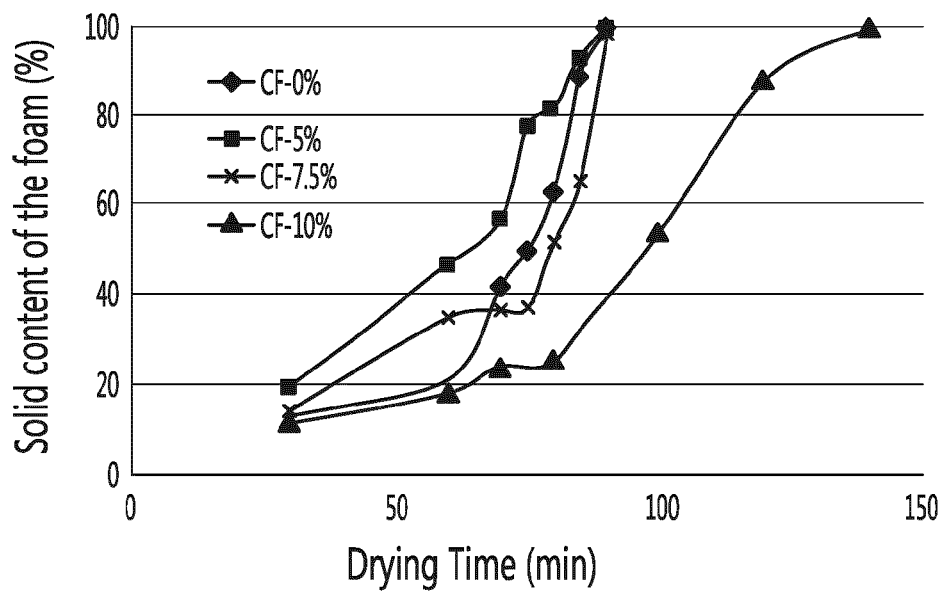
FIG. 9 shows the drying rate of the cellulose filament foamed ULDC at different dosage with conventional oven.

When CF is used in the ULDC materials as described herein, as seen in FIG. 9, the ULDC with cellulose filament needs a longer time to dry then when a high dosage of cellulose filament is used to form the foam due to the high water retention properties of cellulose filament. The drying rate of foamed fibrous materials was not affected when the cellulose filament ratio is equal or lower than 10%.

Figure 10:
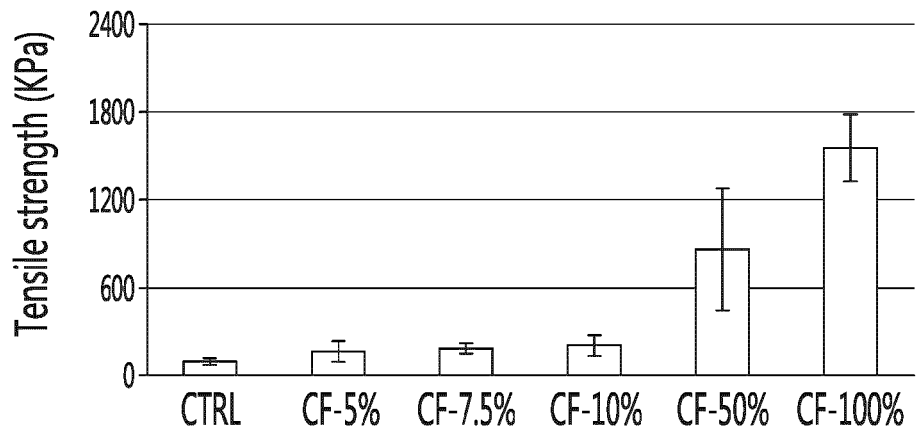
FIG. 10 shows the tensile strength parallel to the surface of cellulose foam with different CF ratio.

The tensile strength of ULDC made with regular pulp fiber was 96 KPa (FIG. 10). With addition of cellulose filament, the tensile strength increased drastically; with 10% of cellulose filament in the foam, the tensile strength parallel to the surface increased to 203 KPa (doubled the tensile strength). With addition of 50% cellulose filament, the tensile strength increased to 854 KPa (increase of 890%). The tensile strength of 100% cellulose filament foamed ULDC was 1559 KPa (increase of 1623%).

Figure 11:
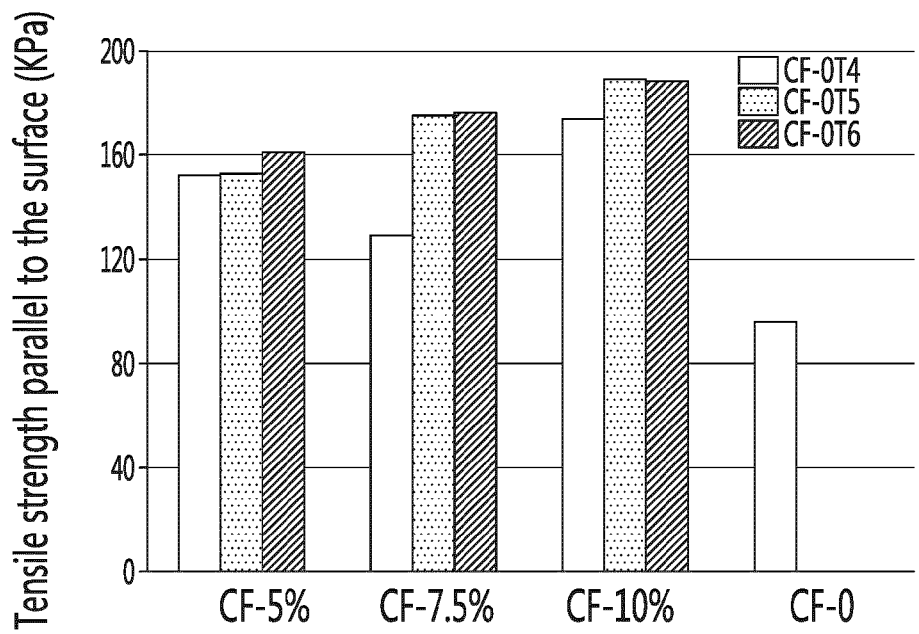
FIG. 11 shows the tensile strength parallel to the surface of CF foam with dispersed CF at different energy level.

Three types of CF produced from different energy levels with different dosage were used to produce ultra-low density foam materials. All CF was well dispersed prior to the foaming process. 5%, 7.5% and 10% (oven dry based or OD) CF was added into the system. The tensile strength of the dry CF foam was compared, and the results indicated that higher CF ratio gave higher tensile strength (FIG. 11). The cellulose foam made of CF produced from higher energy level showed better tensile strength.

Figure 12:
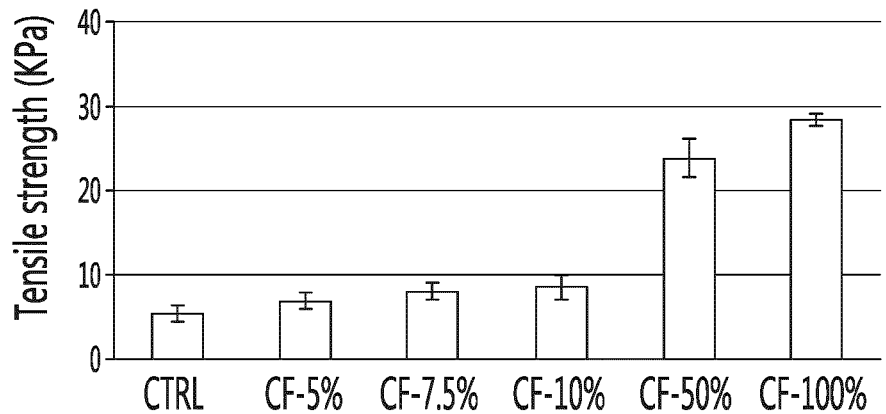
FIG. 12 shows the tensile strength perpendicular to the surface of cellulose foam with different CF ratio.

The interior bonding strength of the fibers within the sample is showed in FIG. 12. The interior bonding strength of the ULDC with addition of CF was measured according to the standard of ASTM C209-07a. The tensile strength perpendicular to the surface was calculated as the average of the loads pounds-force per square foot at the time failure of the test specimens. The tensile strength perpendicular to the surface was improved 30%, 50% and 59% for the ULDC samples with addition of 5%, 7.5% and 10% CF, respectively.

Figure 13:
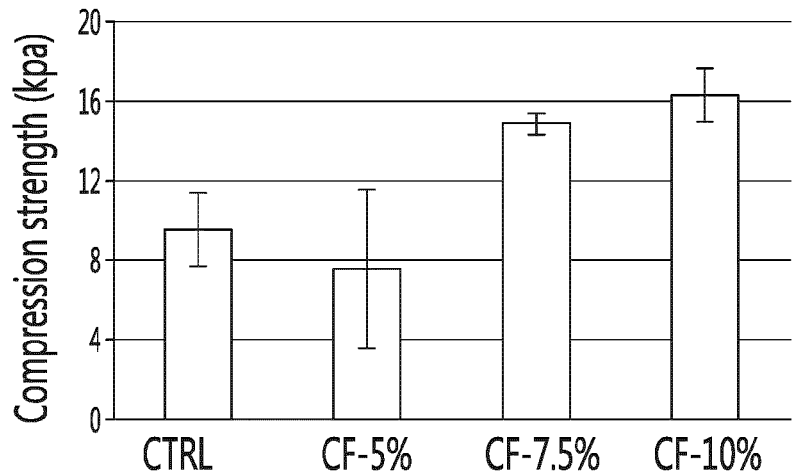
FIG. 13 shows the compression strength of CF foam at 10% deformation.

The compression strength of ULDC with addition of CF was measured according to ASTM D1037. The results were presented in FIG. 13. The compression strength dropped from 9.6 KPa to 7.6 KPa when 5% CF was added, while it increased to 14.9 KPa, 55% improvement with 7.5% CF addition to the ULDC. This value increased to 16.3 KPa with addition of 10% CF, which is 70% improvement.

Figure 14:
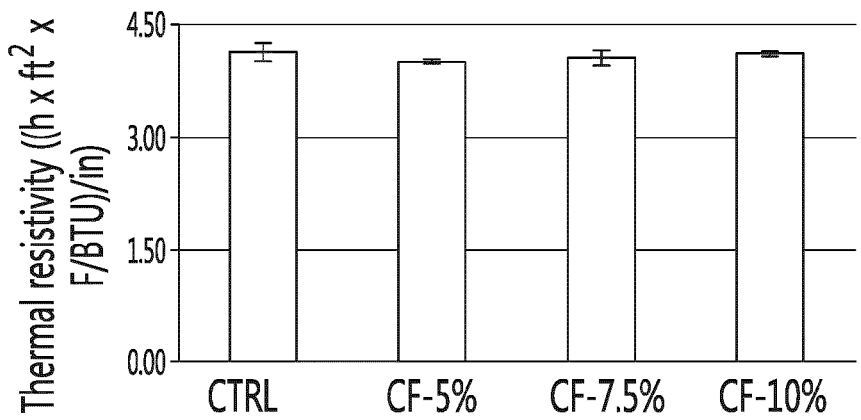
FIG. 14 shows the thermal resistance properties of cellulose foam with addition of CF.

The thermal resistance properties of cellulose foam with addition of CF (FIG. 14), were measured, showing the properties of the ULDC produced comprising CF, wherein for example the impact of adding CF is not significant on the thermal resistant properties of the cellulose foam. The thermal conductivity and thermal resistant properties of the ULDC with addition of different dosage of CF was measured according to ASTM C518 and the results are presented in FIG. 14. The sample size was 12" by 12" by 1", and it was measured with a heat flow meter apparatus. The R value of the ULDC control sample was 4.13. This value is 4.01, 4.05 and 4.11 for the ULDC with addition of 5%, 7.5% and 10% CF, respectively. There is no significant impact on the thermal resistant properties of ULDC with adding CF into the formulation. The control samples are ULDC made without adding CF.

Figure 20:
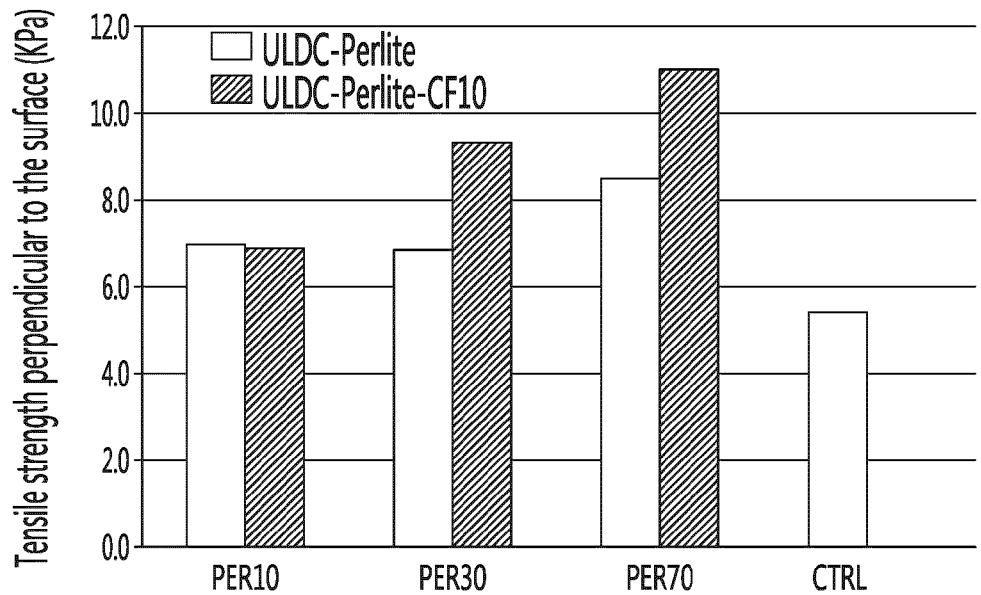
FIG. 20 illustrates the tensile strength measured perpendicular to surface of ULDC with addition of different dosage of perlite plus CF/CTMP (10/90)
Figure 22:
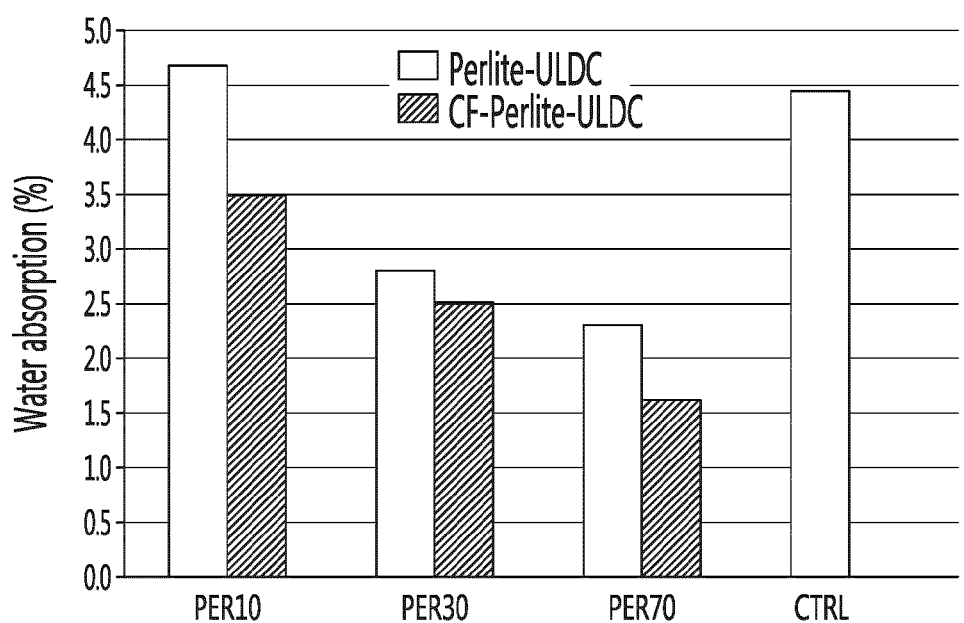
FIG. 22 illustrates the water resistant properties of ULDC with addition of different dosage of perlite plus CF/CTMP (10/90).

As described herein, ULDC produced by the methods described herein can comprise CF and also additionally can comprise inorganic chemicals. As disclosed herein, perlite plus 10% of CF was used in the production of ULDC wherein the resulting foam has increased tensile strength and less water absorption properties for example (see FIGS. 20 and 22 respectively).

EXAMPLE 1

Raw materials: wet TMP, CTMP or kraft pulp or dry CTMP, kraft, MDF fiber, recycle fibre or other type of natural fiber; as well as at least one adhesive are directly obtained from a refiner for introduction into the foaming apparatus.

One sizing agent and one foaming agent are added to form a base formulation which has a wet strength and maintains a foam structure after the gas injection with the twin rotation. In preferred embodiment other components: inorganic components, mold/decay/fire resistant agent are optionally added based on final product requirements.

772.5 g of CTMP fiber with 674.4 g solid content is pre-soaked in 10450 g tap water overnight.

82.5 g kraft fiber with 74.7 g solid content are also pre-soaked in 2000 g tap water overnight and disintegrated 5 min to separate the fibers.

The presoaked and premixed fibers are introduced into the foaming apparatus along with chemicals at a rotational speed of 1480 rpm for 2 min and while the gas sparging, in this case compressed air injection with a controlled volume and speed. The following are further added:

1498.1 g polyacrylamide (PAM, 0.5%, solid content 7.5 g), 569.3 g Polyvinyl acetate (PVAc, 5%, 28.5 g solid content), 5.7 g hardener of PVAc, 121.7 g Alkyl ketene dimmer (AKD, 15%, 22.5 g solid content) and 111.9 g sulphate dodecyl sodium (SDS, 10%, 11.2 g solid content) are pumped into the fiber suspension.

37.5 g silicon dioxide ($SiO_2$) and 37.5 g potassium sulfate ($K_2SO_4$) are then introduced into the fiber suspension.

Foaming and forming procedure—the rotational speed of the foaming apparatus is increased to 1580 rpm and mixed for 1 min; the rotational speed is increased to 2250 rpm for 1-3 min. The foamed fiber suspension is discharged to a forming box and where it is drained for 1-10 min. The forming frame with the damp foam is removed and sent to a dryer. FIG. 1(*b*) shows the dry fiber foam materials. The foam bubble size was measured and the size distribution is in the range of 20 μm-200 μm, which also shows the foam distribution is much more uniform than the prior art in FIG. 1(*a*) (Deng et al.)

EXAMPLE 2

Mold and Decay Resistant Formula—ULDC-FBA

Raw materials used in this example 2 are: wet TMP, CTMP or kraft fiber directly from refiner or dry CTMP, kraft, MDF fiber, recycle fibre or other type of natural fiber; chemicals and other components.

154.5 g CTMP fiber (solid content 134.9 g) and 16.5 g (solid content 14.9 g) kraft fiber are presoaked into 2490 g tap water overnight. The presoaked fiber is introduced to the foaming apparatus. 225 g PAM (0.5%, solid content 1.125 g), 114 g PVAc (5%, solid content 5.7 g), 1.14 g PVAc hardner, 24.32 g AKD (15%, solid content 3.648g), 7.5 g $SiO_2$ and 7.5 g $K_2SO_4$, 22.4 g SDS (10%, solid content 2.24 g) are pumped into the fiber suspension. 2.25-5.25 g boric acid are added into the fiber suspension.

The air sparging/injection are started at a controlled volume while beating the fiber at a rotational speed of 1500rpm for 2.5 min. The fiber suspension is foamed to a known volume and the fibrous foam discharged to a forming box. The forming box is drained for 1-10 min. The forming frame is removed and then is sent to the dryer.

EXAMPLE 3

Mold and Decay Resistant Formula 2—ULDC-FNC

Raw materials for example 3 are: fiber CTMP, Kraft, water, other chemical components 154.5 g fiber (solid content 134.9 g) CTMP fiber and 16.5 g (solid content 14.9 g) kraft fiber are presoaked into 2490 g tap water overnight. The presoaked fiber is introduced to the foaming apparatus. 75 g PAM (0.5%, solid content 1.125 g), 114 g PVAc (5%, solid content 5.7 g), 1.14 g PVAc hardener, 24.3 g AKD (15%, solid content 3.648g), 7.5 g $SiO_2$ and 7.5 g $K_2SO_4$, 67.2 g SDS (10%, solid content 6.72 g) are pumped into the fiber suspension. 2.25 g-5.25 g disodium octaborate and 1.5-3 g $CuSO_4$ are added into the fiber suspension.

The air sparging/injection is initiated a controlled volume rate and beating the fiber at a rotation speed of 1500 rpm for 2.5 min. The fiber suspension is foamed to known volume and the fibrous foam is discharged to a forming box. The forming box is drained 1-10 min. The forming frame is removed and then sent to the dryer.

EXAMPLE 4

Mold and Decay Resistant Formula 3—ULDC-FZC

Raw materials are at least one of a wet TMP, CTMP or Kraft pulp directly from refiner or dry CTMP, Kraft, MDF fiber, recycle fibre or other type of natural fiber; chemicals and mold/decay/fire resistance agent. 154.5 g CTMP fiber (solid content 134.9 g) and 16.5 g kraft fiber (solid content 14.9 g) are presoaked into 2490 g tap water overnight. The presoaked fiber is introduced to the foaming apparatus. 75 g PAM (0.5%, solid content 1.125 g), 114 g PVAc (5%, solid content 5.7 g), 1.14 g PVAc hardener, 24.3 g AKD (15%, solid content 3.648g), 7.5 g $SiO_2$ and 7.5 g $K_2SO_4$, 44.8 g SDS (10%, solid content 6.72 g) are pumped into the fiber suspension. 2.25-4.50 g zinc borate to 1.5-3 g $CuCO_3$ are added into the fiber suspension.

The air sparging/injection are initiated at a controlled volume rate while beating the fiber at a rotation speed of 2250 rpm for 2.5 min. The fiber suspension is foamed to known volume and the fibrous foam discharged to a forming box. The forming box is drained 1-10 min. The forming frame is removed and sent to the dryer.

Figure 8:
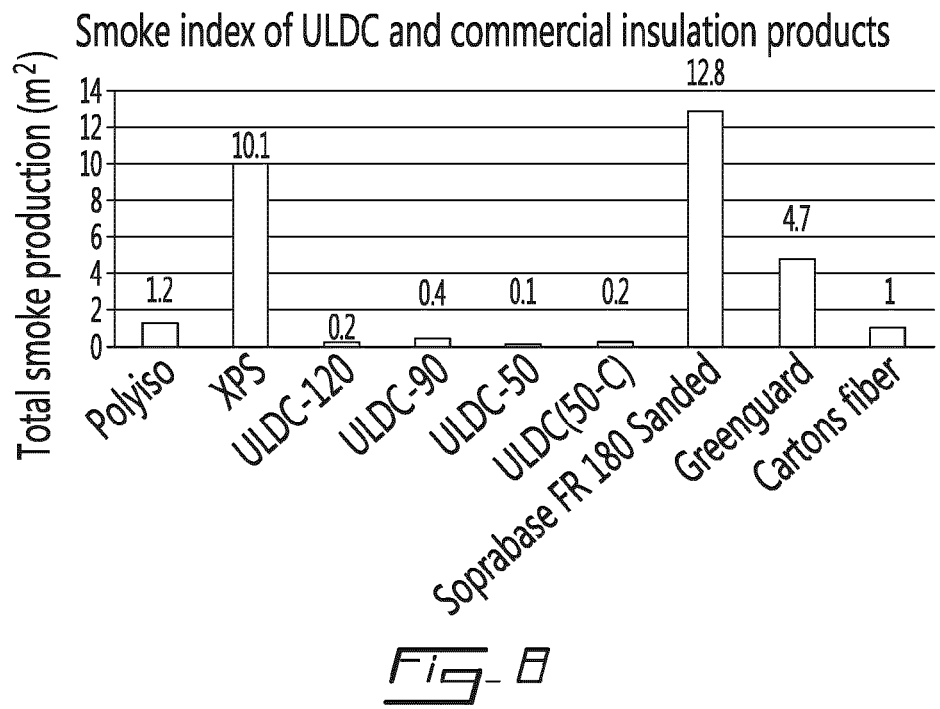
FIG. 8 illustrates the fire test results of Smoke Index ULDC according to several embodiments the present invention having different density, compared with commercial thermal insulation products; Polyiso™, XPS, Soprabase™ FR180 (sanded), Greenguard™ and Carton fibers.

FIG. 8 illustrates the fire test results of Smoke Index of several ULDC with different density foams according to several embodiments of the present invention, compared with commercial products; Polyiso™, XPS, Soprabase™ FR180 (sanded), Greenguard™ and Carton fibers. The total smoke production of ULDC composites of the present application is much lower than the commercial market products, which reduce the smoke choke risk drastically than the toxic petro-based commercial products. Smoke Index of ULDC were determined with different density and commercial insulation products (ULDC-20 means density of 120 kg/m³, ULDC-90 means density is 90 kg/cm³, ULDC-50 means density is 50 kg/cm³).The samples used for the smoke and fire test were prepared with the formulation in Example 1 as base. Different ULDC density was prepared with minor adjustment of the dosage and process parameters.

Table 1 is the ULDC materials specification made from the gas injection upflow foaming process. The density range is typical for the insulation applications and packaging. However, this density range can be expanded to larger range for different applications, such as dry wall panel or foaming paper.

TABLE 1 showed the typical properties of the ULDC materials (Materials specification)

| Properties | ASTM Test Methods | | Test value |
|---|---|---|---|
| Water Absorption (2 hrs.) | C-209 | (% vol) | 1.4 |
| Thermal Resistance per inch of thickness | C-518 | h · ft2 · ° F./Btu | R-4.0 |
| Compression Strength at 10% deformation | C-165 | (KPa) | 22.6 |
| Water Vapour Permeance | E-96 (B) | (ng/Pa · s · m²) | 3490 |
| Density (Typical Range)* | D-1037 | (kg/m³) | 15-150 |
| Mold Growth | AWPA E24 | | No growth |
| Decay | AWPA E10 | | Highly decay resistant |

*this density range is typical for the insulation applications and packaging. However, this density range can be expanded to larger range for different applications, such as dry wall panel or foaming paper.

Table 2 presents the mold resistant test on the ULDC materials after a period of 8 weeks. Mold growth on each sample was rated with a 0 to 5 rating scale based on the surface coverage of mold growth on the 2 faces and 4 edges of the sample, i.e. 0=no mold growth; 1=mold growth on less than 5% of sample surface area; 2=mold growth on more than 5% but less than 25% of sample surface area; 3=mold growth on more than 25% but less than 50% of sample surface area; 4=mold growth on more than 50% but less than 75% of sample surface area; and 5=mold growth on more than 75% of sample surface area. Average ratings from the 10 replicate samples of each group were used for evaluating the mold resistance of the treatments.

The results showed that no mold growth was found on samples of ULDC-FNC which was prepared in Example 3 and on ULDC-FZC which was prepared in Example 4. Slight mold growth (rating<1) was found on samples of ULDC-FBA which was prepared in Example 2. All other control samples from different materials and products were all, more or less, affected by mold growth.

TABLE 2

Mold growth on ULDC samples at 25° C. and 100% relative humidity for 8 weeks

| Sample code | Mold growth rating (0-5) | | Sample affection rate (%) |
|---|---|---|---|
| | Average | SD | |
| ULDC-FBA1 | 0.6 | 0.72 | 60 |
| ULDC-FBA2 | 0.27 | 0.38 | 50 |
| ULDC-FBA3 | 0.47 | 0.47 | 70 |
| ULDC-FNC1 | 0 | 0 | 0 |
| ULDC-FNC2 | 0 | 0 | 0 |
| ULDC-FNC3 | 0 | 0 | 0 |
| ULDC-FZC1 | 0 | 0 | 0 |
| ULDC-FZC2 | 0 | 0 | 0 |
| ULDC-FZC3 | 0 | 0 | 0 |
| ULDC-Control | 0.77 | 0.86 | 90 |
| XPS | 0.07 | 0.12 | 20 |
| Polyiso | 3.73 | 2.19 | 100 |
| Fiberglass | 0.07 | 0.12 | 20 |
| Rockwool | 1.17 | 0.29 | 100 |
| Particleboard | 4.4 | 0.56 | 100 |
| MDF | 5 | 0 | 100 |
| Pine sapwood | 4.93 | 0.06 | 100 |

Table 3 is the materials decay resistant properties of ULDC and its controls. To correlate weight losses of the samples and their decay resistance of the materials, it can be interpreted as: average weight loss %: 0-10, highly resistant;

11-24, resistant; 25-44 moderately resistant; 45 and over, nonresistant (ASTM D2017-05). Based on this correlation, it can be concluded that the samples of FZC1, FZC2, FZC3 (FZC is a group of samples based on Example 4 with different dosage) are highly decay resistant, FNC1, FNC2, FBA1, FBA2 and FBA3 are decay resistant, FNC3, Control are moderately decay resistant, where FNC samples are from Example 3, FBA series samples are from Example 2, ULDC-Control is samples from Example 1. All other control samples from different materials and products were ranked from high decay resistance to nonresistance to white-rot or brown-rot.

TABLE 3

Weight losses (%) of ULDC samples in decay test at 25° C. and 100% relative humility for 16 weeks

| | White-rot | | | | Brown-rot | | | | |
|---|---|---|---|---|---|---|---|---|---|
| | T. versicolor | | I. lacteus | | G. trabeum | | P. placenta | | Decay |
| Panel type | Average | SD | Average | SD | Average | SD | Average | SD | resistance |
| ULDC-FBA1 | 19.06 | 4.18 | 14.99 | 2.52 | 13.60 | 5.03 | 12.00 | 10.34 | Good |
| ULDC-FBA2 | 12.65 | 4.79 | 17.79 | 4.87 | 16.22 | 7.15 | 17.84 | 14.50 | Good |
| ULDC-FBA3 | 14.47 | 4.46 | 17.30 | 3.98 | 17.25 | 4.03 | 19.19 | 12.73 | Good |
| ULDC-FNC1 | 10.64 | 1.28 | 9.79 | 1.32 | 16.47 | 3.40 | 13.83 | 2.75 | Good |
| ULDC-FNC2 | 12.02 | 0.96 | 12.65 | 2.28 | 13.50 | 1.66 | 12.58 | 1.80 | Good |
| ULDC-FNC3 | 22.15 | 1.21 | 22.58 | 1.79 | 26.25 | 1.26 | 26.07 | 1.17 | Moderate |
| ULDC-FZC1 | 6.37 | 0.53 | 7.70 | 0.40 | 10.72 | 3.11 | 8.00 | 3.67 | High |
| ULDC-FZC2 | 7.04 | 0.89 | 6.76 | 0.83 | 8.00 | 1.26 | 8.67 | 4.98 | High |
| ULDC-FZC3 | 4.84 | 0.70 | 5.37 | 1.36 | 6.92 | 2.78 | 4.89 | 1.06 | High |
| ULDC-Control | 18.89 | 5.15 | 16.60 | 5.21 | 16.21 | 3.57 | 29.63 | 32.21 | Moderate |
| XPS | 1.33 | 0.36 | 1.17 | 0.27 | 1.42 | 0.31 | 1.40 | 0.24 | High |
| Polyiso | 18.60 | 4.52 | 18.72 | 1.45 | 29.28 | 1.40 | 24.28 | 5.50 | Moderate |
| Fiberglass | 2.96 | 3.22 | 0.00 | 9.28 | 0.13 | 1.17 | 0.00 | 0.83 | High |
| Rockwool | 0.77 | 0.28 | 3.32 | 2.09 | 0.39 | 0.18 | 0.00 | 2.21 | High |
| Particleboard | 30.32 | 11.58 | 59.17 | 6.20 | 29.13 | 2.94 | 7.88 | 5.59 | Non |
| MDF | 6.34 | 0.48 | 47.87 | 14.86 | 6.78 | 3.36 | 5.56 | 1.56 | Non |
| Pine sapwood | 43.91 | 6.47 | 27.51 | 7.72 | 66.26 | 3.55 | 44.51 | 32.84 | Non |

EXAMPLE 5

High Consistency Pre-mixing Method of Producing ULDC

Materials used: 820.8 g of CTMP fiber with 716.5 g solid content, 87.7 g of Kraft fiber with 79.3 g solid content; 3315 g of hot water; 1600 g of PAM 0.5% solid content; 605 g of polyvinyl acetate at 5% solid content; 6.0 g of hardener of polyvinyl acetate; 129.0 g of Alkyl ketene dimmer at 15% solid content; 40 g of silicon dioxide; 40 g of potassium sulfate, 370 g of sulphate dodecyl sodium at 10% solid content.

The required amount of CTMP and Kraft pulp are pre-soaked in required amount of hot water (55° C.) for 5 minutes. At the same time, other materials, which include PAM, polyvinyl acetate, hardener of polyvinyl acetate, alkyl ketene dimmer, silicon dioxide, potassium sulfate, sulphate dodecyl sodium are introduced into the foaming apparatus:

Pre-soaked fibers are introduced into the foaming apparatus at a rate of ~500 g/min. At the beginning of the fiber loading, and the rotational speed of the foaming apparatus is set at 500 RPM and will go as high as 1500 RPM at the end of the fiber loading. The pre-soaked fibers along with the chemicals are then mixed together at a rotational speed of 1500 RPM for 5 min following compressed air injection, combined with an increment of the rotational speed that reaches to 3000 RPM in 20 sec. The material is mixed until desire air content occurred.

EXAMPLE 6

Method to Produce Pre-fabricated Foaming-able Pulp Fiber to Produce ULDC

Materials used: 820.8 g of CTMP fiber with 716.5 g solid content, 87.7 g of Kraft fiber with 79.3 g solid content; 1600 g of PAM 0.5% solid content; 605 g of polyvinyl acetate at 5% solid content; 6.0 g of hardener of polyvinyl acetate; 129.0 g of Alkyl ketene dimmer at 15% solid content; 40 g of silicon dioxide; 40 g of potassium sulfate, 370 g of sulphate dodecyl sodium at 10% solid content, 3315 g of hot water.

CTMP and Kraft pulps are shredded using hammer mill with ¾ inch screen. Required amount of CTMP fiber and Kraft fiber are introduced to a rotary blender with mixing blades. 2 atomizer nozzles are used simultaneously to introduce the chemicals. One atomizer nozzle is used to apply a mix of the following chemicals at a rate of 90 g/min including PAM, polyvinyl acetate, the hardener of polyvinyl acetate, and alkyl ketene dimmer and the other nozzle is used to apply sulphate dodecyl sodium at the rate of 90 g/min into the blender to mix with shredded pulp with mixing blade at 30 RPM. Potassium sulfate and silicon dioxide are loaded afterwards. After all chemicals are loaded and the mixture is further mixed for another 5 minutes. After that, a pre-mixed material is collected.

The required amount of hot water is introduced into the foaming apparatus. The pulp fiber pre-mixed with all chemicals is slowly added to the foaming apparatus. The rotational speed of the foaming apparatus is set at 500 RPM and goes to 1500 RPM right after loading, followed by mixing at 1500 RPM for 5 min with compressed air injection, combined with an increment of the rotational speed that reaches to 3000 RPM in 20 sec.

EXAMPLE 7

Method to Produce Pre-fabricated Foamable Pulp Fiber to Produce ULDC

Materials used: 820.8 g of CTMP fiber with 716.5 g solid content, 87.7 g of Kraft fiber with 79.3 g solid content; 1600 g of PAM 0.5% solid content; 605 g of polyvinyl acetate at 5% solid content; 6.0 g of hardener of polyvinyl acetate; 129.0 g of Alkyl ketene dimmer at 15% solid content; 40 g of silicon dioxide; 40 g of potassium sulfate, 370 g of sulphate dodecyl sodium at 10% solid content, CTMP and Kraft pulps are shredded using hammer mill with a ¾ inch screen. Required amount of CTMP fiber and Kraft fiber are introduced to a rotary blender with mixing blades. 2 atomizer nozzles are used simultaneously to introduce the chemicals. One atomizer nozzle is used to apply a mix of the following chemicals at a rate of 90 g/min including PAM, polyvinyl acetate, the hardener of polyvinyl acetate, and alkyl ketene dimmer. The other nozzle is used to apply sulphate dodecyl sodium at the rate of 90 g/min into the blender to mix with shredded pulp with mixing blade at 30 RPM. Potassium sulfate and silicon dioxide are afterwards loaded. After all chemicals are loaded, the mixture is further mixed for another 5 minutes before collecting the pre-mixed materials.

The pre-mixed materials are dried to moisture content of about 40% (based on oven dry weight), and densified to form a block of wood fiber with all chemicals using a compression press. The block is then dried to a moisture content lower than 15%wt. (based on oven dry weight) (5% MC in this example).

The 7600 gram of hot water is introduced into the foaming apparatus. The block of pulp fiber pre-mixed with all chemicals (700 grams) is slowly added to the foaming apparatus, the rotational speed of the foaming apparatus being set at 500 RPM and goes to 1500 RPM right after loading, followed by mixing at 1500 RPM for 5 min with compressed air injection, combined with an increment of the rotational speed that reaches to 3000 RPM in 20 sec.

EXAMPLE 8

High Consistence Continuous ULDC Manufacturing Method

The dry wood pulp is added into dilution water in the preparation tank (1000 liters tank) to a 2.9% fiber consistence. The wood pulp is disintegrated for about 15 minutes. The disintegrated wood pulp is then pumped into the feed tank where it is being agitated (10 000 liters tank). The wood pulp is then pumped into a twin roll press with a pulp rate (OD, oven dry) at 1.25 kg/min, where the fiber consistency is brought to 18.3%. The twin roll press then discharges the thickened pulp at 18.3% consistence into a mixing conveyor.

The chemicals (PAM, PVA, Hardener, AKD, Potassium sulfate, SDS) are introduced into the mixing conveyor using metering pumps and flowmeters in order to reach the required loading. The SDS flow rate was added at 1.04 liter per minute (lpm) and the chemical mixture flow rate is 0.98 lpm. Dilution water is added in the mixing conveyor using a metering pump and flowmeter in order to lower the consistency to the final requirement. The mixing conveyor discharges into the progressive cavity pump hopper. The progressive cavity pump increases the pressure and forces the material to go through a high shear mixer.

A metered amount of pressurized gas is introduced in the high shear mixer casing to reach the required air ratio. The gas flow rate is 25 standard liter per minute (slpm). The pulp foam exits the high shear mixer through a pipe. And the pressure of the high shear mixer is 40 psi during the process. The pressure drop is controlled using a pinch valve. This device allows the control over the expansion of the gas bubbles. The foam discharge pressure is atmosphere 1.0 (abs. ATM). The pulp foam is then sent to the forming box where the shape of the final product is set. The fiber consistence of the wet foam is 15.5%. The wet bulk density of the foam is 153 kg/m$^3$. The final product is sent to the multi-zone air dryer until the moisture content is low enough to allow packaging. The dried ULDC foam produced from this example is 26 kg/m$^3$ and this density range can be controlled by different approaches.

EXAMPLE 9

Ultra-low Density Foamed Composites with CF/Pulp (100/0)

Wet cellulose filament (CF), minimum 1 type of adhesive, 1 type of sizing agent and 1 type of surfactant is needed to form the base formulation. The other components such as inorganic components, mold/decay/fire resistant agent are optional depending on the final products requirement.

2516 g CF with 29.8% solid content was put in a foaming equipment, and 10683 g of water was added into the CF. It was disintegrated for a certain period, 15min with a rotation speed of 200-1800rpm. The fiber and chemicals were mixed with a rotation speed of 1480 rpm for 2 min and air was injected with a controlled volume and speed. 7.5 g polyacrylamide (PAM), 28.5 g polyvinyl acetate (PVAc), 5.7 g hardener of PVAc, 22.5 g Alkyl ketene dimmer (AKD) solution at 15% solid content and 11.2 g sulphate dodecyl sodium (SDS) at 10% solid content were pumped into fiber suspension. 37.5 g silicon dioxide (SiO$_2$) and 37.5 g potassium sulfate (K$_2$SO$_4$) were introduced into the fiber suspension.

Foaming and forming procedure was accomplished by increasing the rotation speed to 1580 rpm and mix for 1 min. Even increasing rotation speed to 2250 rpm for 1-3 min was also used. The foamed fiber suspension was discharged to the forming box and it was drained 1-10 min. The forming frame was removed and the foamed fiber was sent into the dryer.

EXAMPLE 10

Ultra-low Density Foamed Composites with CF/Pulp (50/50)

Wet CF (29.8% solid content), CTMP, Kraft and chemicals including polyacrylamide, Polyvinyl acetate, hardener of PVAc, Alkyl ketene dimmer, sulphate dodecyl sodium, silicon dioxide and potassium sulfate were used.

300 g CTMP (oven dry based) and 75 g kraft (oven dry based) were presoaked into 12450 g tap water overnight. The presoaked fiber was introduced to the foaming apparatus. 1258.4 g CF (29.8%) was added into the foaming apparatus and it was disintegrated with the presoaked pulp fiber for 10-15 min with a rotation speed of 200-1800 rpm. The fiber and chemicals were mixed with a rotation speed of 1480 rpm for 2 min and air was injected with a controlled volume and speed. 7.5 g g polyacrylamide (PAM), 28.5 g Polyvinyl acetate (PVAc), 5.7 g hardener of PVAc, 22.5 g g Alkyl ketene dimmer (AKD) solution at 15% solid content and 11.2 g sulphate dodecyl sodium (SDS) at 10% solid content were pumped into the fiber suspension. 37.5 g silicon dioxide (SiO$_2$) and 37.5 g potassium sulfate (K$_2$SO$_4$) were introduced into the fiber suspension.

The air injection was started with controlled volume and the fiber was beaten with a rotation speed of 1500 rpm for 2.5 min. The fiber suspension foamed to known amount of volume and the fibrous foam was discharged to a forming box. The forming box was drained 1-10 min. The forming frame wax removed and then the fibrous foam sent to the dryer.

EXAMPLE 11

Ultra-low Density Foamed Composites with CF/Pulp (10/90)

Cellulose filament, fiber CTMP, Kraft, water, and other chemical components were used. The CF with 29.8% solid content was pre-dispersed with a helico pulper at room temperature for 15 min at 1800 rpm with 4% fiber consistence.

600 g CTMP (oven dry based) and 75 g kraft (oven dry based) were presoaked into 11512 g tap water overnight. 1875 g pre-dispersed CF (4%) was added into the foaming apparatus and it was disintegrated with the presoaked pulp fiber for 10-15 min with a rotation speed of 200-1800 rpm. The fiber and chemicals were mixed with a rotation speed of 1480 rpm for 2 min and air was injected with a controlled volume and speed. 7.5 g polyacrylamide (PAM), 28.5 g Polyvinyl acetate (PVAc), 5.7 g hardener of PVAc, 22.5 g Alkyl ketene dimmer (AKD) solution at 15% solid content and 11.2 g sulphate dodecyl sodium (SDS) at 10% solid content were pumped into the fiber suspension. 37.5 g silicon dioxide ($SiO_2$) and 37.5 g potassium sulfate ($K_2SO_4$) were introduced into the fiber suspension.

The air injection was started with controlled volume and the fiber beaten with a rotation speed of 1500 rpm for 2.5 min. The fiber suspension was foamed to known amount of volume and the fibrous foam discharged to a forming box. The forming box was drained 1-10 min. The forming frame was removed and then the fibrous foam was sent to the dryer.

EXAMPLE 12

Ultra-low Density Foamed Composites with CF/Pulp (7.5/92.5)

The CF with 29.8% solid content was pre-dispersed with a helico pulper at certain temperature from 30° C.-80° C. for 15 min at 1800 rpm with 4% fiber consistence. The helico pulper is a pulp disintegrator widely used in paper industry.

618.8 g CTMP (oven dry based) and 75 g kraft (oven dry based) were presoaked into 11746.9 g tap water overnight. 1406.2 g pre-dispersed CF (4%) was added into the foaming apparatus and it was disintegrated with the presoaked pulp fiber for 10-15 min with a rotation speed of 200-1800 rpm. The fiber and chemicals were mixed with a rotation speed of 1480 rpm for 2 min and air injected with a controlled volume and speed. 7.5 g g polyacrylamide (PAM), 28.5 g Polyvinyl acetate (PVAc), 5.7 g hardener of PVAc, 22.5 g g Alkyl ketene dimmer (AKD) solution at 15% solid content and 11.2 g sulphate dodecyl sodium (SDS) at 10% solid content were pumped into the fiber suspension. 37.5 g silicon dioxide ($SiO_2$) and 37.5 g potassium sulfate ($K_2SO_4$) were introduced into the fiber suspension.

The air injection was started with controlled volume and the fiber beaten with a rotation speed of 1500 rpm for 2.5 min. The fiber suspension was foamed to known amount of volume and the fibrous foam discharged to a forming box. The forming box was drained 1-10 min. The forming frame was then removed and the fibrous foam was sent to the dryer.

EXAMPLE 13

Ultra-low Density Foamed Composites with CF/Pulp (5/95)

The CF with 29.8% solid content was pre-dispersed with a helico pulper at certain temperature from 30° C.-80° C. for 15 min at 1800 rpm to 4% fiber consistence. 637.5 g CTMP (oven dry based) and 75 g kraft (oven dry based) were presoaked into 11981.5 g tap water overnight. 937.5 g pre-dispersed CF (4%) was added into the foaming apparatus and it was disintegrated with the presoaked pulp fiber for 10-15 min with a rotation speed of 200-1800 rpm. The fiber and chemicals were mixed with a rotation speed of 1480 rpm for 2 min and air injected with a controlled volume and speed. 7.5 g polyacrylamide (PAM), 28.5 g Polyvinyl acetate (PVAc), 5.7 g hardener of PVAc, 22.5 g Alkyl ketene dimmer (AKD) solution at 15% solid content and 11.2 g sulphate dodecyl sodium (SDS) at 10% solid content were pumped into the fiber suspension. 37.5 g silicon dioxide ($SiO_2$) and 37.5 g potassium sulfate ($K_2SO_4$) were introduced into the fiber suspension.

The air injection was started with controlled volume and the fiber beaten with a rotation speed of 1500 rpm for 2.5 min. The fiber suspension was foamed to known amount of volume and the fibrous foam was discharged to a forming box. The forming box was drained 1-10 min. The forming frame was removed and then the fibrous foam was sent to the dryer.

EXAMPLE 14

Ultra-low Density Foamed Composites with CF/Pulp (3/97)

The CF with 29.8% solid content was pre-dispersed with a helico pulper at certain temperature from 30° C.-80° C. for 15 min at 1800 rpm with 4% fiber consistence. 652 g CTMP (oven dry based) and 75 g kraft (oven dry based) were presoaked into 12168.7 g tap water overnight. 562.6 g pre-dispersed CF (4%) was added into the foaming apparatus and it was disintegrated with the presoaked pulp fiber for 10-15 min with a rotation speed of 200-1800 rpm. The fiber and chemicals were mixed with a rotation speed of 1480 rpm for 2 min and air injected with a controlled volume and speed. 7.5 g polyacrylamide (PAM), 28.5 g Polyvinyl acetate (PVAc), 5.7 g hardener of PVAc, 22.5 g Alkyl ketene dimmer (AKD) solution at 15% solid content and 11.2 g sulphate dodecyl sodium (SDS) at 10% solid content were pumped into the fiber suspension. 37.5 g silicon dioxide ($SiO_2$) and 37.5 g potassium sulfate ($K_2SO_4$) were introduced into the fiber suspension.

The air injection was started with controlled volume and the fiber beaten with a rotation speed of 1500 rpm for 2.5 min. The fiber suspension was foamed to known amount of volume and the fibrous foam discharged to a forming box. The forming box was drained 1-10 min, removed and then the fibrous foam was sent to the dryer.

EXAMPLE 15

Ultra-low Density Foamed Composites with CF/Pulp (1/99)

The CF with 29.8% solid content was pre-dispersed with a helico pulper at certain temperature from 30° C.-80° C. for 15 min at 1800 rpm with 4% fiber consistence.

667.5 g CTMP (oven dry based) and 75 g kraft (oven dry based) were presoaked into 12450 g tap water overnight. 187.5 g pre-dispersed CF (4%) was added into the foaming apparatus and it was disintegrated with the presoaked pulp fiber for 10-15 min with a rotation speed of 200-1800 rpm. The fiber and chemicals were mixed with a rotation speed of 1480 rpm for 2 min and air injected with a controlled volume and speed. 7.5 g polyacrylamide (PAM), 28.5 g Polyvinyl acetate (PVAc), 5.7 g hardener of PVAc, 22.5 g Alkyl ketene dimmer (AKD) solution at 15% solid content and 11.2 g sulphate dodecyl sodium (SDS) at 10% solid content were pumped into the fiber suspension. 37.5 g silicon dioxide ($SiO_2$) and 37.5 g potassium sulfate ($K_2SO_4$) were introduced into the fiber suspension.

The air injection was started with controlled volume and the fiber beaten with a rotation speed of 1500 rpm for 2.5 min. The fiber suspension was foamed to known amount of volume and the fibrous foam discharged to a forming box. The forming box was drained 1-10 min, removed and then the fibrous foam was sent to the dryer.

EXAMPLE 16

Never-dry CF (30% Consistency) Produced from Different Energy Level and Pre-Dispersed in a Helico Pulper at 4% Consistency at 50° C., 15 min Prior to be Used for the Foaming Process 696.7 g CTM, 80.5 g kraft, 937.5 g pre-dispersed CF-OT4 (5%Cs, OT4, OT5 and OT 6 are different energy level used to produce CF, which means from low, medium to high level), 11981.5 g water were added into the foaming tank. 1498.11 g PAM PERCOL-175 (0.5% solid content), 569.3 (5%) PVAc, 5.7 g of PVAc hardener, 121.5 g alkyl ketene dimer (AKD) solution at 15% solid content, 37.45 g silicon dioxide, 37.45 g potassium sulfate and 112 g sulphate dodecyl sodium at 10% solid content were added into the foaming tank. The fiber and chemicals were mixed with a rotation speed of 1480 rpm for 2 min and air injected with a controlled volume and speed.

674.8 g CTM, 80.5 g kraft, 1406.2 g pre-dispersed CF-OT4 (5%Cs), 11981.5 g water were added into the foaming tank. 1498.11 g PAM PERCOL-175 (0.5% solid content), 569.3 (5%) PVAc, 5.7 g of PVAc hardener, 121.5 g alkyl ketene dimer (AKD) solution at 15% solid content, 37.45 g silicon dioxide, 37.45 g potassium sulfate and 112 g sulphate dodecyl sodium at 10% solid content were added into the foaming tank. The fiber and chemicals were mixed with a rotation speed of 1480 rpm for 2 min and air injected with a controlled volume and speed.

655.7 g CTM, 80.5 g kraft, 1875 g pre-dispersed CF-OT4 (5%Cs), 11981.5 g water were added into the foaming tank. 1498.11 g PAM PERCOL-175 (0.5% solid content), 569.3 (5%) PVAc, 5.7 g of PVAc hardener, 121.5 g alkyl ketene dimer (AKD) solution at 15% solid content, 37.45 g silicon dioxide, 37.45 g potassium sulfate and 112 g sulphate dodecyl sodium at 10% solid content were added into the foaming tank. The fiber and chemicals were mixed with a rotation speed of 1480 rpm for 2 min and air injected with a controlled volume and speed.

696.7 g CTM, 80.5 g kraft, 937.5 g pre-dispersed CF-OT5 (5%Cs), 11981.5 g water were added into the foaming tank. 1498.11 g PAM PERCOL-175 (0.5% solid content), 569.3 (5%) PVAc, 5.7 g of PVAc hardener, 121.5 g alkyl ketene dimer (AKD) solution at 15% solid content, 37.45 g silicon dioxide, 37.45 g potassium sulfate and 112 g sulphate dodecyl sodium at 10% solid content were added into the foaming tank. The fiber and chemicals were mixed with a rotation speed of 1480 rpm for 2 min and air injected with a controlled volume and speed.

674.8 g CTM, 80.5 g kraft, 1406.2 g pre-dispersed CF-OT5 (5%Cs), 11981.5 g water were added into the foaming tank. 1498.11 g PAM PERCOL-175 (0.5% solid content), 569.3 (5%) PVAc, 5.7 g of PVAc hardener, 121.5 g alkyl ketene dimer (AKD) solution at 15% solid content, 37.45 g silicon dioxide, 37.45 g potassium sulfate and 112 g sulphate dodecyl sodium at 10% solid content were added into the foaming tank. The fiber and chemicals were mixed with a rotation speed of 1480 rpm for 2 min and air injected with a controlled volume and speed.

655.7 g CTM, 80.5 g kraft, 1875 g pre-dispersed CF-OT5 (5%Cs), 11981.5 g water were added into the foaming tank. 1498.11 g PAM PERCOL-175 (0.5% solid content), 569.3 (5%) PVAc, 5.7 g of PVAc hardener, 121.5 g alkyl ketene dimer (AKD) solution at 15% solid content, 37.45 g silicon dioxide, 37.45 g potassium sulfate and 112 g sulphate dodecyl sodium at 10% solid content were added into the foaming tank. The fiber and chemicals were mixed with a rotation speed of 1480 rpm for 2 min and air injected with a controlled volume and speed.

696.7 g CTM, 80.5 g kraft, 937.5 g pre-dispersed CF-OT6 (5%Cs), 11981.5 g water were added into the foaming tank. 1498.11 g PAM PERCOL-175 (0.5% solid content), 569.3 (5%) PVAc, 5.7 g of PVAc hardener, 121.5 g alkyl ketene dimer (AKD) solution at 15% solid content, 37.45 g silicon dioxide, 37.45 g potassium sulfate and 112 g sulphate dodecyl sodium at 10% solid content were added into the foaming tank. The fiber and chemicals were mixed with a rotation speed of 1480 rpm for 2 min and air injected with a controlled volume and speed.

674.8 g CTM, 80.5 g kraft, 1406.2 g pre-dispersed CF-OT6 (5%Cs), 11981.5 g water were added into the foaming tank. 1498.11 g PAM PERCOL-175 (0.5% solid content), 569.3 (5%) PVAc, 5.7 g of PVAc hardener, 121.5 g alkyl ketene dimer (AKD) solution at 15% solid content, 37.45 g silicon dioxide, 37.45 g potassium sulfate and 112 g sulphate dodecyl sodium at 10% solid content were added into the foaming tank. The fiber and chemicals were mixed with a rotation speed of 1480 rpm for 2 min and air injected with a controlled volume and speed.

655.7 g CTM, 80.5 g kraft, 1875 g pre-dispersed CF-OT6 (5%Cs), 11981.5 g water were added into the foaming tank. 1498.11 g PAM PERCOL-175 (0.5% solid content), 569.3 (5%) PVAc, 5.7 g of PVAc hardener, 121.5 g alkyl ketene dimer (AKD) solution at 15% solid content, 37.45 g silicon dioxide, 37.45 g potassium sulfate and 112 g sulphate dodecyl sodium at 10% solid content were added into the foaming tank. The fiber and chemicals were mixed with a rotation speed of 1480 rpm for 2 min and air injected with a controlled volume and speed.

The fiber suspensions produced were foamed to known amount of volume and the fibrous foams discharged to a forming box. The forming box was drained 1-10 min, removed and then the fibrous foams were sent to the dryer.

EXAMPLE 17

ULDC Formulation with Addition of Perlite Plus CF/Pulp (10/90)

Figure 15:
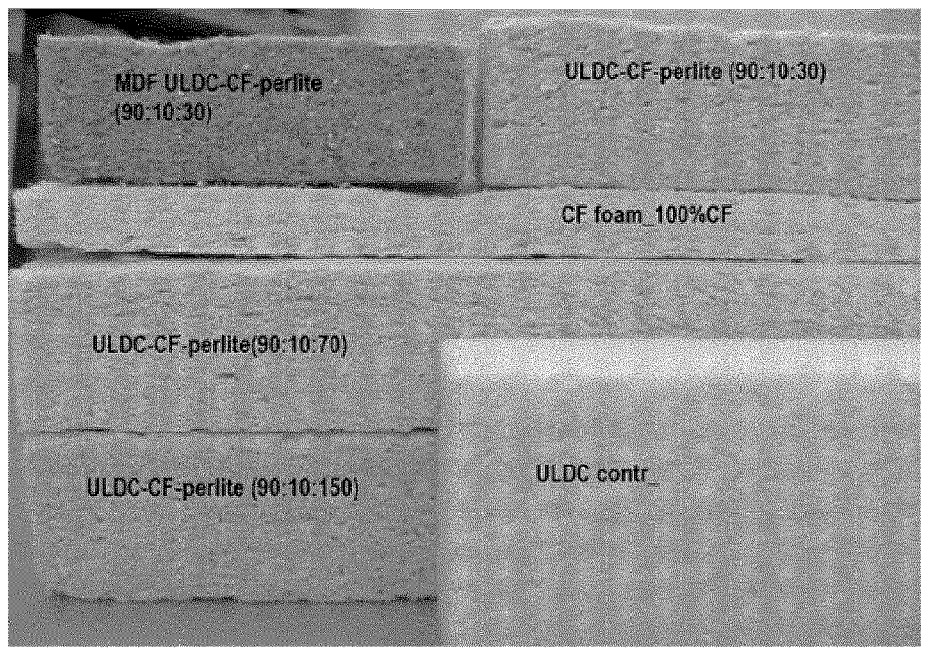
FIG. 15 shows sample pictures of ULDC made from cellulose filament (CF) and perlite in accordance with one embodiment.
Figure 16A:
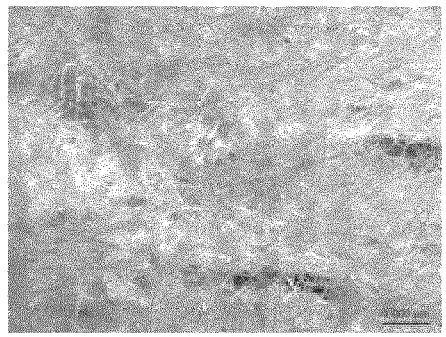
FIG. 16 shows microscope pictures of ULDC (a), ULDC made with Perlite 70 (b), ULDC made from cellulose filament (CF) and perlite 70 (c) or Perlite 150 (d)
Figure 16B:
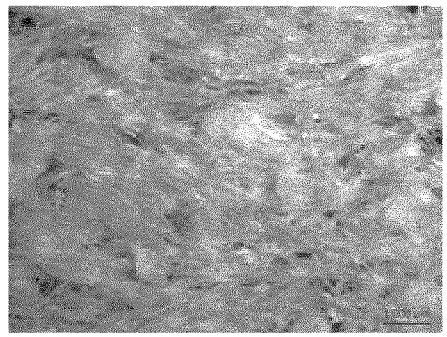
Figure 16C:
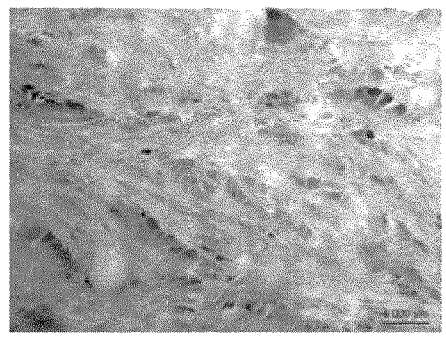
Figure 16D:
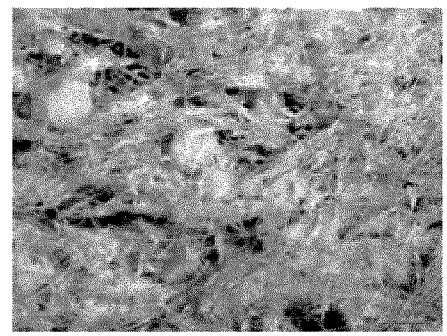
Figure 17A:
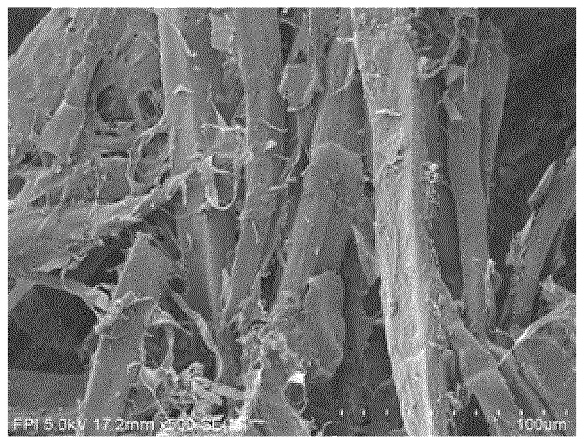
FIG. 17 shows scanning electronic microscope pictures of ULDC made from (a) CTMP/Kraft, and (b) with perlite and CF, whereas in (c) the interphase between pulp fiber-CF-perlite is shown.
Figure 17B:
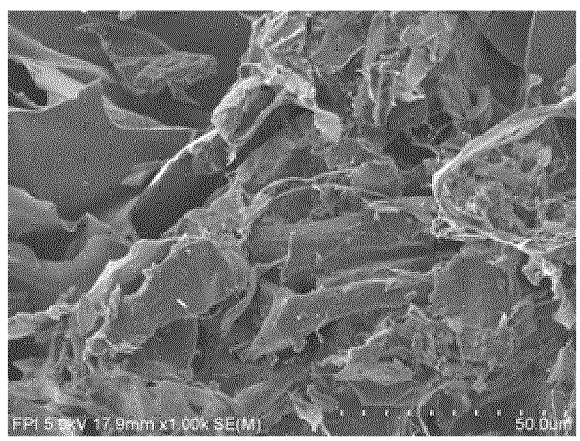
Figure 17C:
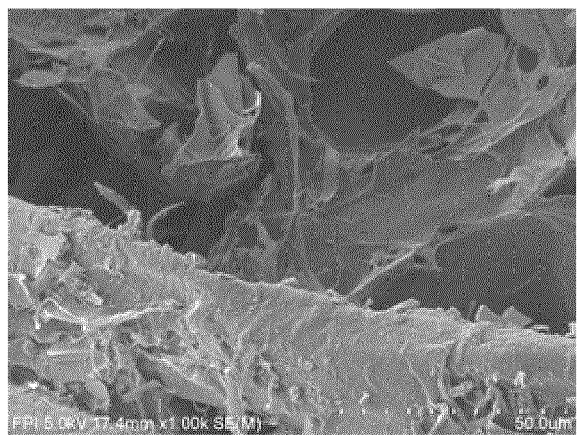

As described herein, ULDC produced by the methods described herein can comprise CF and also additionally can comprise inorganic chemicals. Table 4 described ULCD formulation comprising for example the inorganic chemical perlite and CF/pulp (10/90). Sample pictures and microscopic pictures are depicted din FIGS. 15 to 17.

TABLE 4

ULDC formulation with addition of perlite plus CF/pulp (10/90)

| Sample Group ID | Perlite (g) | Si₂O (g) | K₂SO₄ (g) | CF (OD)** (g) | CTMP (OD)** (g) |
|---|---|---|---|---|---|
| ULDC-Perlite 10 | 75 | 0 | 0 | 0 | 750 |
| ULDC-Perlite 30 | 225 | 0 | 0 | 0 | 750 |
| ULDC-Perlite 70 | 525 | 0 | 0 | 0 | 750 |
| ULDC-Perlite 10-CF10 | 75 | 0 | 0 | 75 | 750 |
| ULDC-Perlite 30-CF10 | 225 | 0 | 0 | 75 | 675 |
| ULDC-Perlite 70-CF10 | 525 | 0 | 0 | 75 | 675 |
| ULDC-Perlite 150-CF10 | 1125 | 0 | 0 | 75 | 675 |
| ULDC-contr | 0 | 37.5 | 37.5 | 0 | 675 |

Figure 18:
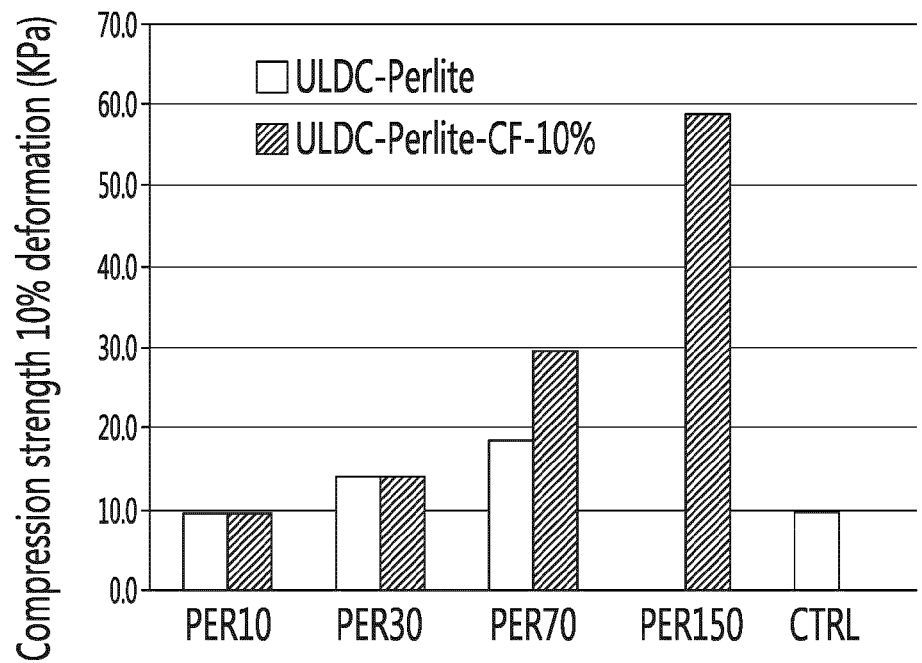
FIG. 18 illustrates the compression strength of ULDC with addition of different dosage of perlite and CF.
Figure 19:
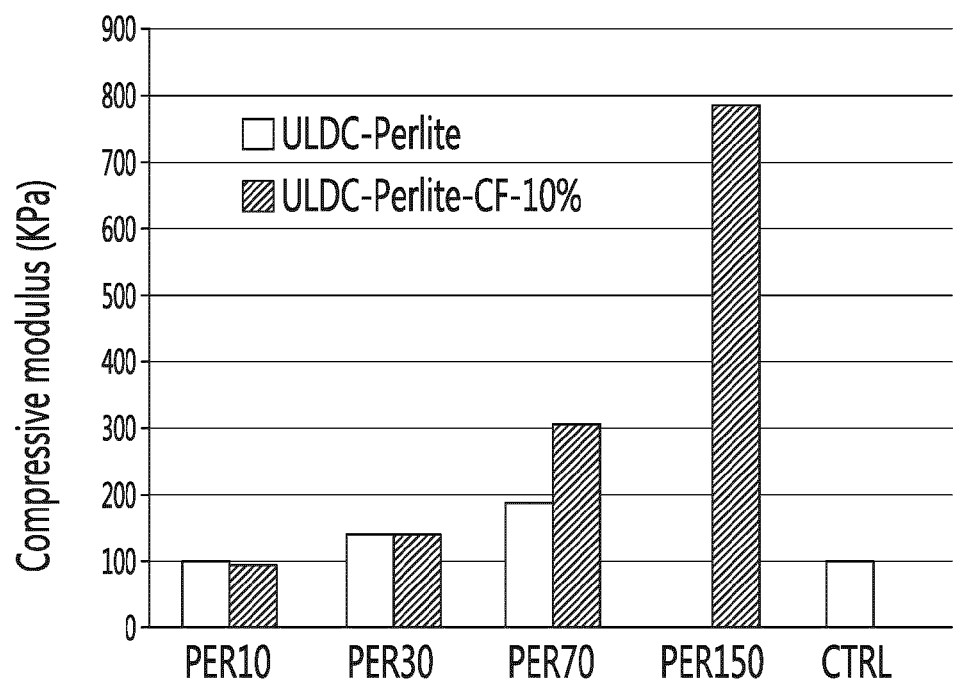
FIG. 19 shows the compression modulus of ULDC with addition of different dosage of perlite plus CF/CTMP (10/90)
Figure 21:
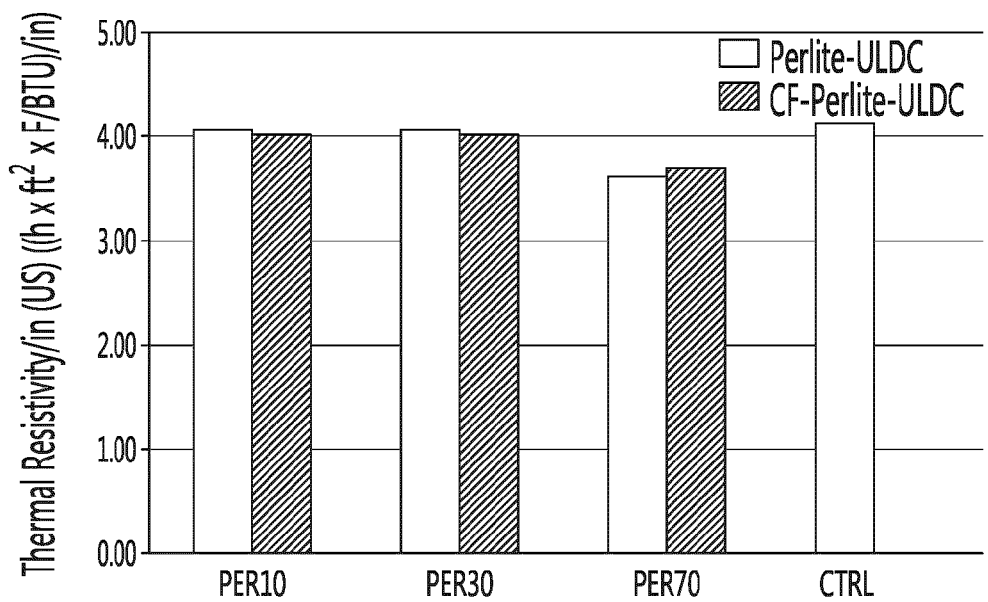
FIG. 21 shows the thermal resistant properties of ULDC with addition of different dosage of perlite plus CF/CTMP (10/90)

*10/90 is the ratio of CF/pulp, where in the example the pulp is CTMP, any other type of market pulp can be used to replace CTMP.
**OD—oven dry weight The compression strength and modulus of ULDC foam made with high loading of perlite (60%) plus 4% CF is 778% than ULDC control samples (FIG. 18 and FIG. 19). The tensile strength ULDC of high loading perlite (60%) plus 4% CF is doubled (FIG. 20), R-value (FIG. 21) and water absorption (FIG. 22) properties were measured for the resulting foam. The improvement of the mechanical strength of ULDC with addition of perlite and CF makes it possible for the ULDC to be used not only in cavity insulation where mechanical strength is not required, but also on roof insulation, interior wall and exterior wall, ceiling, packaging and other application which mechanical strengths are required. The addition of 4% CF increases the retention ability of high loading of perlite to the ULDC.

The invention claimed is:

1. A method for producing a natural fiber ultra-low density composite (ULDC) foam, the method comprising the steps of:
    feeding a fiber suspension and at least one additive into a continuous overflow apparatus;
    disintegrating the fiber in the fiber suspension;
    sparging gas into the apparatus from the base;
    agitating the suspension and the at least one additive to produce the foam; and
    discharging the foam through an outlet by overflow.

2. The method of claim 1, wherein the suspension has 0.1-30% by weight fiber consistency.

3. The method of claim 1, wherein the foam has a dry weight based density between 10 kg/m³ to 150 kg/m³.

4. The method of claim 1, further comprising drainage and drying of the discharged foam from the apparatus to produce a ULDC foam mat.

5. The method of claim 4, wherein the ULDC mat is dried to reduce moisture content in the mat to less than 15% by weight moisture as a percentage of the total mat.

6. The method of claim 1, wherein cellulose filament (CF) is fed to the apparatus.

7. The method of claim 1, comprising adding an inorganic component into the apparatus.

8. The method of claim 1, wherein the at least one additive is an adhesive, an adhesive hardener, a sizing agent, a mold resistant compound, a fiber decay resistant compound, a fire resistant compound, a smoke resistant compound, a foaming agent, or a combinations thereof.

9. The method of claim 8, wherein the adhesive is polyvinyl alcohol (PVA), poly(vinyl acetate) (PVAc), or a combination thereof; the sizing agent is alkyketene dimer (AKD) or any other chemicals can do the sizing function; the inorganic component is zinc borate, cupric carbonate (CuCO3), disodium octaborate, cupric sulfate (CuSO4), boric acid, perlite, silicon dioxide (SiO2), potassium sulfate (K2SO4), or a combination thereof; and/or the foaming agent is sodium dodecyl sulphate (SDS) or/and other surfactants.

10. The method of claim 1, wherein said fiber suspension comprises wood pulp.

11. A natural fiber ultra-low density composite (ULDC) foam comprising:
    a natural fiber,
    cellulose filament (CF); and
    a foaming agent,
    wherein the foam has a density from 10 kg/m³ to 150 kg/m³ with open cell foam structure; and wherein the CF comprises lengths of 300-350 μm.

12. The foam of claim 11, further comprising nanofilament.

13. The foam of claim 11, wherein the CF is from wood pulp or plant pulp.

14. The nanofilament of claim 12, wherein the nanofilament is from wood pulp or plant pulp.

15. The foam of claim 11, further comprising at least one additive.

16. The foam of claims 15, wherein the at least one additive is an adhesive, an adhesive hardener, a sizing agent, a mold resistant compound, a fiber decay resistant compound, a fire resistant compound, a smoke resistant compound, a foaming agent, or a combinations thereof.

17. A method for producing a natural fiber ultra-low density composite (ULDC) foam, the method comprising the steps of:
    mixing pulp and at least one additive to produce a foamable pulp;
    adding water to the foamable pulp producing a fiber suspension;
    feeding the fiber suspension to an apparatus consisting of a refiner;
    sparging gas into the refiner;
    mixing the fiber suspension to produce the foam; and
    discharging the foam through an outlet by overflow.

18. The method of claim 1, wherein the apparatus is a counter-rotating dual rotor tank, a Lamort pulper, a helico pulper, a refiner or a paper mill pulping tank.

* * * * *